(12) United States Patent
Sunada et al.

(10) Patent No.: US 8,589,441 B1
(45) Date of Patent: Nov. 19, 2013

(54) INFORMATION PROCESSING SYSTEM AND METHOD FOR CONTROLLING THE SAME

(75) Inventors: Yoji Sunada, Yokohama (JP); Mitsunori Satomi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 34 days.

(21) Appl. No.: 13/515,756

(22) PCT Filed: May 18, 2012

(86) PCT No.: PCT/JP2012/003265
§ 371 (c)(1),
(2), (4) Date: Jun. 13, 2012

(51) Int. Cl.
*G06F 17/30* (2006.01)

(52) U.S. Cl.
USPC .......................... 707/783; 707/703

(58) Field of Classification Search
USPC .................. 707/636, 703, 783, 786
See application file for complete search history.

(56) References Cited

U.S. PATENT DOCUMENTS

| | | | |
|---|---|---|---|
| 5,628,005 A * | 5/1997 | Hurvig | 1/1 |
| 8,006,233 B2 * | 8/2011 | Centonze et al. | 717/126 |
| 8,069,366 B1 | 11/2011 | Wenzel | |
| 8,332,939 B2 * | 12/2012 | Centonze et al. | 726/22 |
| 8,413,211 B2 * | 4/2013 | Tokutani et al. | 726/2 |
| 2007/0240194 A1 * | 10/2007 | Hargrave et al. | 726/1 |
| 2008/0077752 A1 | 3/2008 | Kinoshita | |

FOREIGN PATENT DOCUMENTS

| | | |
|---|---|---|
| JP | 2008-108227 A | 5/2008 |
| WO | 2007041064 A2 | 4/2007 |

OTHER PUBLICATIONS

Athicha Muthitacharoen, Robert Morris, Thomer M. Gil, and Benjie Chen, MIT Laboratory for Computer Science, ACM SIGOPS Operating Systems Review—OSDI '02: Proceedings of the 5th Symposium Operating Systems Design and Implementation, vol. 36, Winter 2002, pp. 31-44.*

* cited by examiner

*Primary Examiner* — Cheryl Lewis
(74) *Attorney, Agent, or Firm* — Volpe and Koenig, P.C.

(57) ABSTRACT

An information processing system includes a plurality of edge nodes to provide services relating to files, and a core node communicatively coupled to each of the edge nodes and configured to send or receive data of the files to or from the edge nodes and to manage the data of the files. Any one of the edge nodes is granted a first access right permitting update of the files, whereas any two or more of the edge nodes are granted a second access right to prohibit update of the files. The core node stores the access right granted to each of the edge nodes. When detecting that a failure has occurred in the edge node granted the first access right, the core node sends one of the edge nodes granted the second access right a first instruction to take over the first access right granted to the failed edge node.

12 Claims, 20 Drawing Sheets

TRANSFER TARGET FILE LIST 141

/dir1/dir2/dir3/xxx.txt
/dir1/dir2/xxx.doc
/dir1/dir2/dir3/xyx.txt
/dir1/dir2/xxx.exe
/dir2/dir2/dir3/xyx.txt
/dir3/dir/xxx.xls
/dir1/dir2/xxx
/dir2/dir2/dir3/xyx.txt
/dir3/dir/

ACCOUNT INFORMATION 144

| ACCOUNT NAME 1441 | PASSWORD 1442 | ACCESS RIGHT 1443 |
|---|---|---|
| account A | ******* | RW |

FIG. 12

EDGE NODE ACCOUNT INFORMATION 243

| ACCOUNT NAME 2431 | PASSWORD 2432 | ACCESS RIGHT 2433 |
|---|---|---|
| account A | ******* | RW |
| account B | ******* | RO |
| account C | ******* | RO |
| account D | ******* | RO |

FIG. 13

TRANSFER-SUCCESS FILE LIST 142

/dir1/dir2/dir3/xxx.txt
/dir1/dir2/xxx.doc
/dir1/dir2/dir3/xyx.txt
/dir1/dir2/xxx.exe
/dir2/dir2/dir3/xyx.txt
/dir3/dir/xxx.xls

FIG. 14

EDGE NODE RESOURCE INFORMATION 242

| EDGE NODE ID | ACCESS RIGHT | OPERATION STATUS | CPU INFORMATION TOP ROW: OPERATION CLK BOTTOM ROW: UTILIZATION | MAIN STORAGE DEVICE INFORMATION TOP ROW: TOTAL CAPACITY BOTTOM ROW: UTILIZATION | COMMUNICATION DEVICE INFORMATION TOP ROW: TRANSMISSION CAPACITY BOTTOM ROW: UTILIZATION |
|---|---|---|---|---|---|
| edgeA | RW | Active | XXX Hz 99% | XXX GB 50% | XXX MB/S 40% |
| edgeB | RO | Active | XXX Hz 92% | XXX GB 40% | XXX MB/S 60% |
| edgeC | RO | Active | XXX Hz 33% | XXX GB 20% | XXX MB/S 50% |
| edgeD | RO | Active | XXX Hz 95% | XXX GB 50% | XXX MB/S 40% |

| EXTERNAL STORAGE DEVICE INFORMATION TOP ROW: TOTAL CAPACITY BOTTOM ROW: UTILIZATION | PRIORITY | TAKEOVER APTITUDE |
|---|---|---|
| XXX TB 25% | — | — |
| XXX TB 20% | 1 | Good |
| XXX TB 40% | 3 | Fair |
| XXX TB 25% | 2 | Not Recomended |

FIG. 17

SUCCESSOR CANDIDATE SELECTION SCREEN

| EDGE NODE ID | ACCESS RIGHT | OPERATION STATUS | PRIORITY | TAKEOVER APTITUDE | SELECTION COLUMN |
|---|---|---|---|---|---|
| edgeA | RW | Active | — | — | |
| edgeB | RO | Active | 1 | Good | O |
| edgeC | RO | Active | 3 | Fair | |
| edgeD | RO | Active | 2 | Not Recomended | |
| : | : | : | : | : | |

[OK] [Cancel]

FIG. 20

INFORMATION PROCESSING SYSTEM AND METHOD FOR CONTROLLING THE SAME

TECHNICAL FIELD

The present invention relates to an information processing system and a method of controlling the information processing system.

BACKGROUND ART

PTL 1 discloses in a storage system coupled via a network to a storage apparatus and a plurality of client hosts coupled to the storage apparatus, centrally storing audit logs, each being information indicating the occurrence of a predetermined audit event such as a failure of a device, for the purpose of easy operation and management of the audit logs. In addition, PTL 1 also discloses that the storage apparatus manages an access right of each client host to an audit log dedicated device where the audit logs are stored. The access right includes an access right "read" to permit only reading of audit logs, an access right "write" to permit only writing of audit logs, and an access right "read/write" to permit both reading and writing of audit logs.

CITATION LIST

Patent Literature

PTL 1: Japanese Patent Application Publication No. 2008-108227

SUMMARY OF INVENTION

Technical Problem

In the storage system described in PTL 1 mentioned above, there is a plurality of client hosts having the "write" access right to one audit log dedicated device. For this reason, when one of the client hosts having the "write" access right has a failure, there is little need to cause another client host to take over the function of the failed client host having the "write" access right. For this reason, PTL 1 does not particularly describe processing for the case where the client host has a failure.

In contrast, there is an information processing system in which a plurality of first information apparatuses are coupled to a single second information apparatus and one of the plurality of first information apparatuses is granted only a "write" access right whereas the other first information apparatuses are granted only "read" access rights. In this information processing system, when a failure occurs in the first information apparatus having the "write" access right, the information processing system needs to cause another first information apparatus granted only the "read" access right to take over the "write" access right in order for the information processing system to provide services continuously.

The present invention has been made in consideration of the foregoing problem, and a main objective of the present invention is to provide an information processing system and a method of controlling the information processing system which, when an apparatus in the information processing system has a failure, allows appropriate selection of a successor to take over the right of the apparatus having the failure.

Solution to Problem

An aspect of the present invention to achieve the foregoing objective is an information processing system including a plurality of first information apparatuses configured to provide service for files, and a second information apparatus communicatively coupled to each of the first information apparatuses and configured to send and receive data of the file to and from the first information apparatuses and to manage the data of the file. At least one of the first information apparatuses is granted a first right that is an access right to permit update of the files, whereas any two or more of the first information apparatuses are granted a second right that is an access right to prohibit update of the file. The second information apparatus stores the access right granted to each of the first information apparatuses. When detecting that the first information apparatus granted the first right has a failure, the second information apparatus sends a first instruction to a certain one of the first information apparatuses granted the second right, the first instruction made to take over the first right granted to the first information apparatus having the failure.

Other problems and solutions thereto will be clearly described in the section of Description of Embodiments and the drawings.

Advantageous Effects of Invention

According to the present invention, when an apparatus in the information processing system has a failure, a successor to take over the right of the failed apparatus can be appropriately selected and made to take over the right.

BRIEF DESCRIPTION OF DRAWINGS

FIG. 12 shows an example of account information 144.

FIG. 13 shows an example of edge node account information 243.

FIG. 14 shows an example of a transfer-success file list 142.

FIG. 17 shows an example of edge node resource information 242.

FIG. 20 shows an example of a successor candidate selection screen 2000.

DESCRIPTION OF EMBODIMENTS

Figure 1:
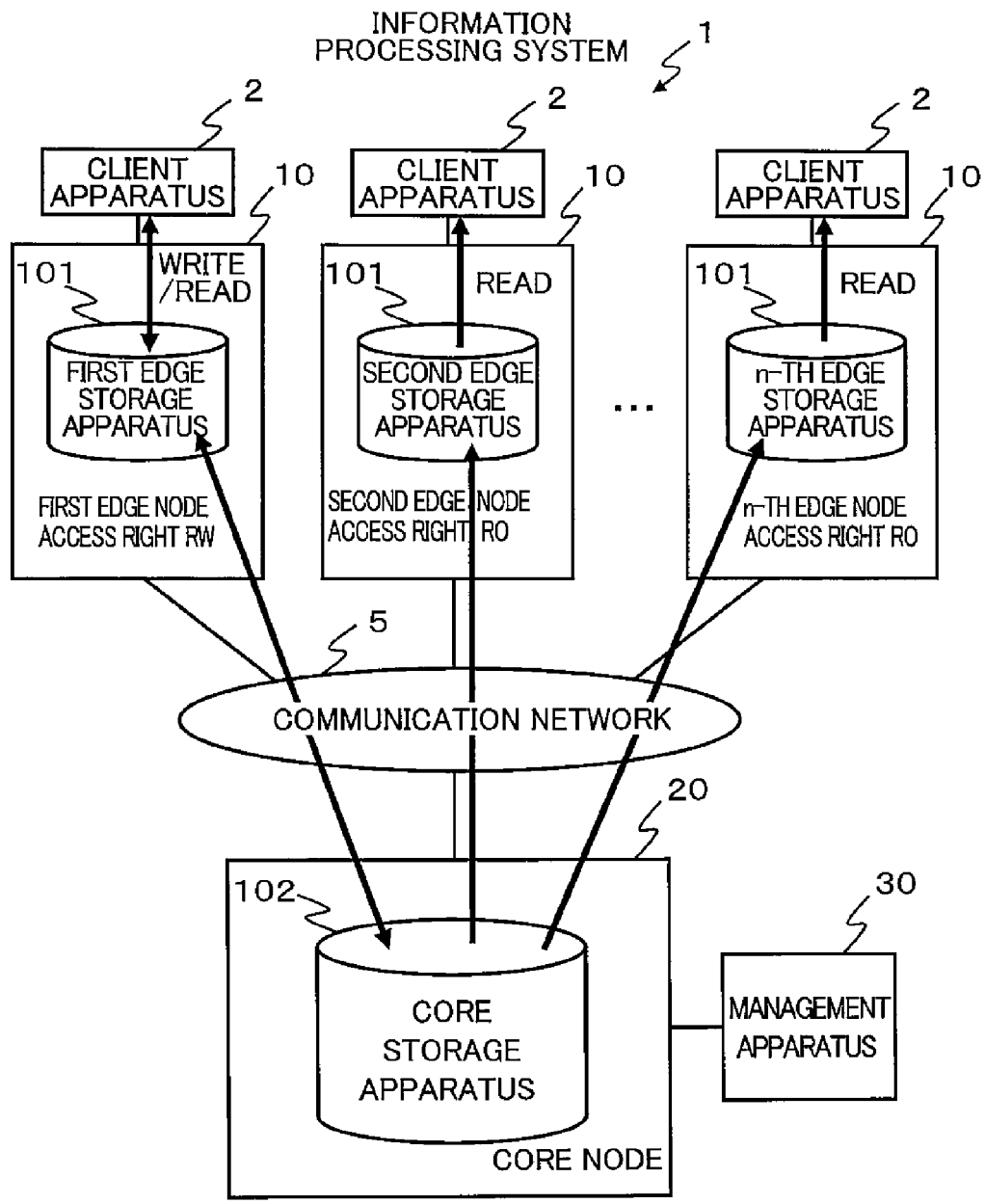
FIG. 1 is a diagram for explaining a schematic configuration of an information processing system 1.

FIG. 1 shows a schematic configuration of an information processing system 1 described as an embodiment. As shown in FIG. 1, the information processing system 1 includes n numbers of information apparatuses (hereinafter referred to as edge nodes 10 (first information apparatuses)) installed at a same edge site or different edge sites, an information apparatus (hereinafter referred to as a core node 20 (second information apparatus)) installed at a core site, and information apparatuses (hereinafter referred to as client apparatuses 2) to access the edge nodes 10.

An edge site is a workplace on a user side, such as a local office, a branch office, and a sub-branch office of a company. A core site is a place, such as a data center or a system center, from which services related to cloud computing and IT resources are provided.

All of the edge nodes 10 are communicatively coupled to the core node 20 through wired or wireless communication networks. A communication network 5 includes, for example, a WAN (Wide Area Network), a LAN (Local Area Network), a SAN (Storage Area Network), the Internet, a public telecommunication network, and a dedicated line.

The edge nodes 10 and the core node 20 are, for example, storage apparatuses (disk array apparatuses), personal computers or main frames. The client apparatuses 2 are, for example, personal computers, office computers, or handheld computing devices.

The core node 20 and the edge nodes 10 each have functions as a file server that manages data of files (including metadata and entity data, and hereinafter simply referred to as "file data") to be provided to the client apparatuses 2. The edge nodes 10 and the core node 20 receive or transmit file data from or to other apparatuses, and thereby provide various services related to use of files, such as cloud-based file management, content sharing (distributed allocation of files among the edge nodes 10), and NAS migration (transparent file migration between a NAS and various server apparatuses).

Each of the edge nodes 10 is granted an access right (permission) to files handled in this information processing system 1 (the access right is a right to update a file (including a right to create a new file), a right to refer to a file, or the like). The present embodiment is based on the assumption that each edge node 10 is granted, as an access right, either an "RW (ReadWrite)" right (first right) to permit both update and reference of files or an "RO (ReadOnly)" right (second right) to permit only reference of files. Note that, however, types of access rights granted to the edge nodes 10 are not limited to those described in the present embodiment.

In the case of the information processing system 1 shown in FIG. 1, a first edge node 10 is granted an access right "RW."

Accordingly, the first edge node 10 can accept both a file update request and a file reference request from the client apparatuses 2.

Upon receipt of a request to update a file from one of the client apparatuses 2, the first edge node 10 updates file data of the file stored in its own storage apparatus (hereinafter referred to as a first edge storage apparatus 101) (or creates data of a new file in the first edge storage apparatus 101 in the case of creating a new file). In addition, upon receipt of a request to refer to a file from one of the client apparatuses 2, the first edge node 10 reads the file from the first edge storage apparatus 101, and returns a reply to the request to the client apparatus 2.

In the case where a file stored in the first edge storage apparatus 101 is updated, the file data of the file (or update difference of the file data) is transferred to the core node 20. Note that this transfer is not always performed in synchronization with the update of the file. The file data transferred to the core node 20 is stored in a storage apparatus in the core node 20 (hereinafter referred to as a core storage apparatus 102) (or the update difference is reflected in the file data already stored in the core storage apparatus 102).

In the case of the information processing system 1 shown in FIG. 1, each of second to n-th edge nodes 10 is granted an access right "RO." Accordingly, each of the second to n-th edge nodes 10 can accept only a file reference request from the client apparatuses 2. Upon acceptance of a request to refer to a file from one of the client apparatuses 2, each of the second to n-th edge nodes 10 reads the requested file from its own storage apparatus (hereinafter referred to as second to n-th edge storage apparatuses 101), and returns a reply to the request to the client 2.

The second to n-th edge nodes 10 access the core node 20 as needed and acquire the latest file data (or the update difference of the file data) updated and transferred by the first edge node 10.

Figure 2:
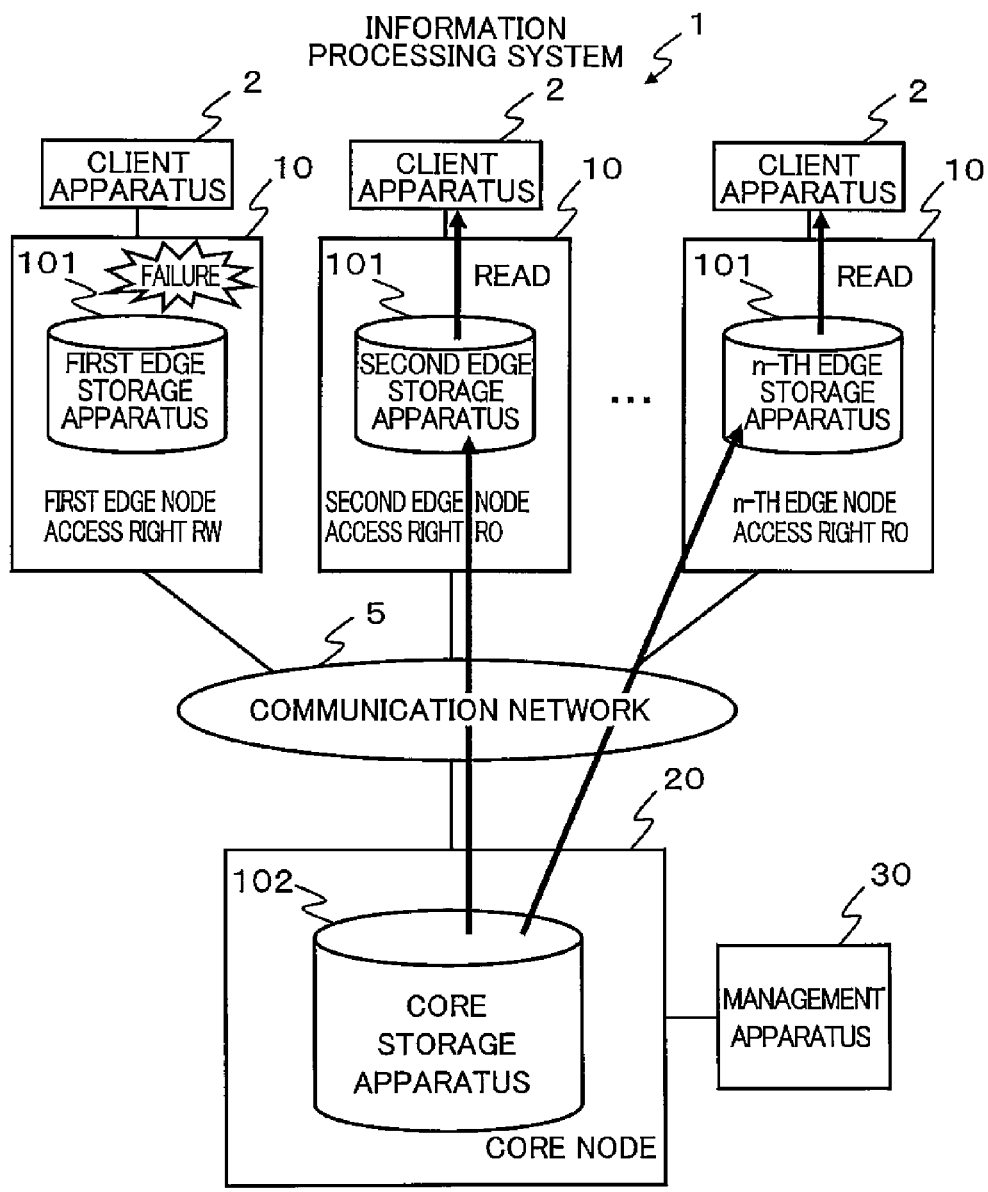
FIG. 2 is a diagram showing a failure occurring in a first edge node 10 granted a "RW" access right.

In the information processing system 1 having the above configuration, when the first edge node 10 granted the access right "RW" has a failure as shown in FIG. 2, the first edge node 10 is taken over by any of the second to n-th edge nodes 10.

Here, this takeover is required to make an outage period of services provided by the information processing system 1 as short as possible, and accordingly needs to be performed quickly after the occurrence of the failure in the first edge node 10. However, in the case where the information processing system 1 is large in scale, or where the information processing system 1 is deployed in a wide area, all the second to n-th edge nodes 10 are not necessarily composed of common resources or the second to n-th edge nodes 10 usually vary from each other in operation status and loaded condition. For these reasons, it takes a lot of time and effort to select a successor apparatus and to make settings of each apparatus.

Figure 3:
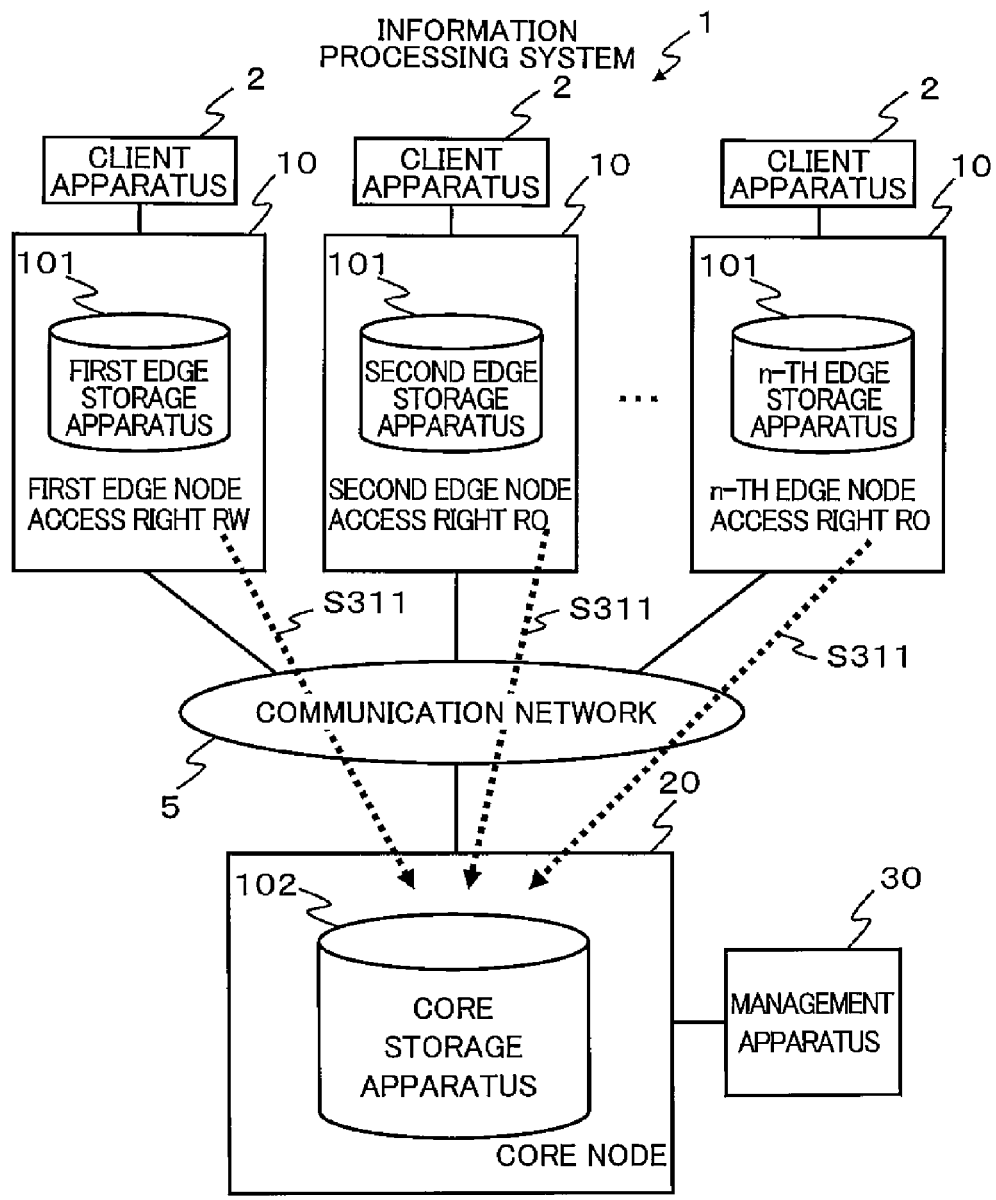
FIG. 3 is a diagram showing a core node 20 collecting resource information of each edge node 10.

To address this, the information processing system 1 of the present embodiment is configured to prepare for the occurrence of a failure in a normal period. Specifically, as shown in FIG. 3, during the normal period, the core node 20 (or a management apparatus 30 communicatively coupled to the core node 20) collects information on resources of each edge node 10 (hereinafter referred to as resource information), such as the operation status, performance, specifications, and the like of the edge node 10 (S311), and determines an aptitude of each edge node 10 as a successor (hereinafter referred to as a takeover aptitude) on the basis of the collected resource information. In this way, the core node 20 is prepared to output the judgment results of the takeover aptitudes whenever needed. Thus, when the first edge node 10 has a failure, an operator or the like can determine an appropriate successor promptly and perform takeover quickly. Here, the aforementioned normal period is a period when the information processing system 1 provides services normally without having a failure of the first edge node 10.

In addition to the foregoing function to output the aptitude of each edge node 10 as a successor, the management apparatus 30 also has a function to output (display or the like) the collected resource information, and a function to output information on the operation status of the edge node 10 acquired based on the collected resource information. Thus, based on the information outputted from the management apparatus 30, the operator or the like can take necessary measurements, such as additional installation of an edge node 10, resource enhancement, and load balancing, during the normal period. In addition, the operator or the like can avoid a situation where the information processing system 1 has to accept performance deterioration or service outage due to the absence of an appropriate successor when a failure occurs.

Figure 4:
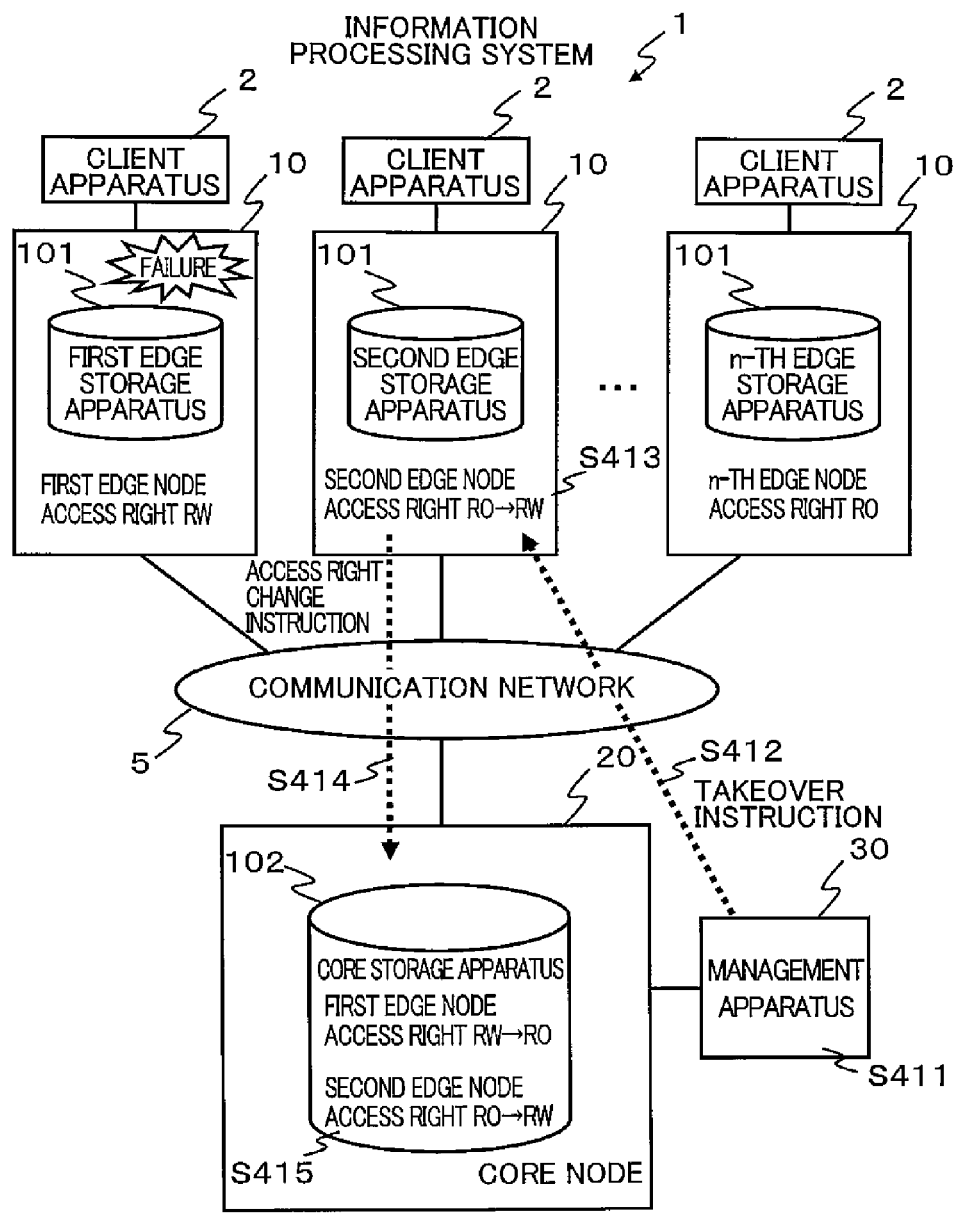
FIG. 4 is a diagram showing that, when a failure occurs in the first edge node 10 granted the "RW" access right, a function of the first edge node 10 is taken over by a second edge node 10 granted an "RO" access right.

FIG. 4 shows takeover performed by the information processing system 1 when the first edge node 10 has a failure. As shown in FIG. 4, when the first edge node 10 has a failure, the management apparatus 30 displays the takeover aptitudes of the respective edge nodes 10 and thereby prompts the operator to select an edge node 10 (S411). When the operator selects the edge node 10 as the successor, the management apparatus 30 sends the selected edge node 10 an instruction to take over the function of the first edge node 10 (hereinafter referred to as a first instruction) (S412). Here, FIG. 4 shows the case where the second edge node 10 is selected as the successor, and where the management apparatus 30 sends the first instruction to the second edge node 10.

Upon receipt of the first instruction, the second edge node 10 changes its own access right from "RO" to "RW" (S413). Moreover, the second edge node 10 sends the core node 20 an instruction to change its own access right (of the second edge node 20) managed by the core node 20 from "RO" to "RW" (hereinafter referred to as a second instruction) (S414).

Upon receipt of the second instruction, the core node 20 changes the access rights of the first edge node 10 and the second edge node 10 managed by the core node 20 itself (S415). After the above changes are completed, the second edge node 10 starts operating as an edge node 10 granted the access right "RW."

Figure 5:
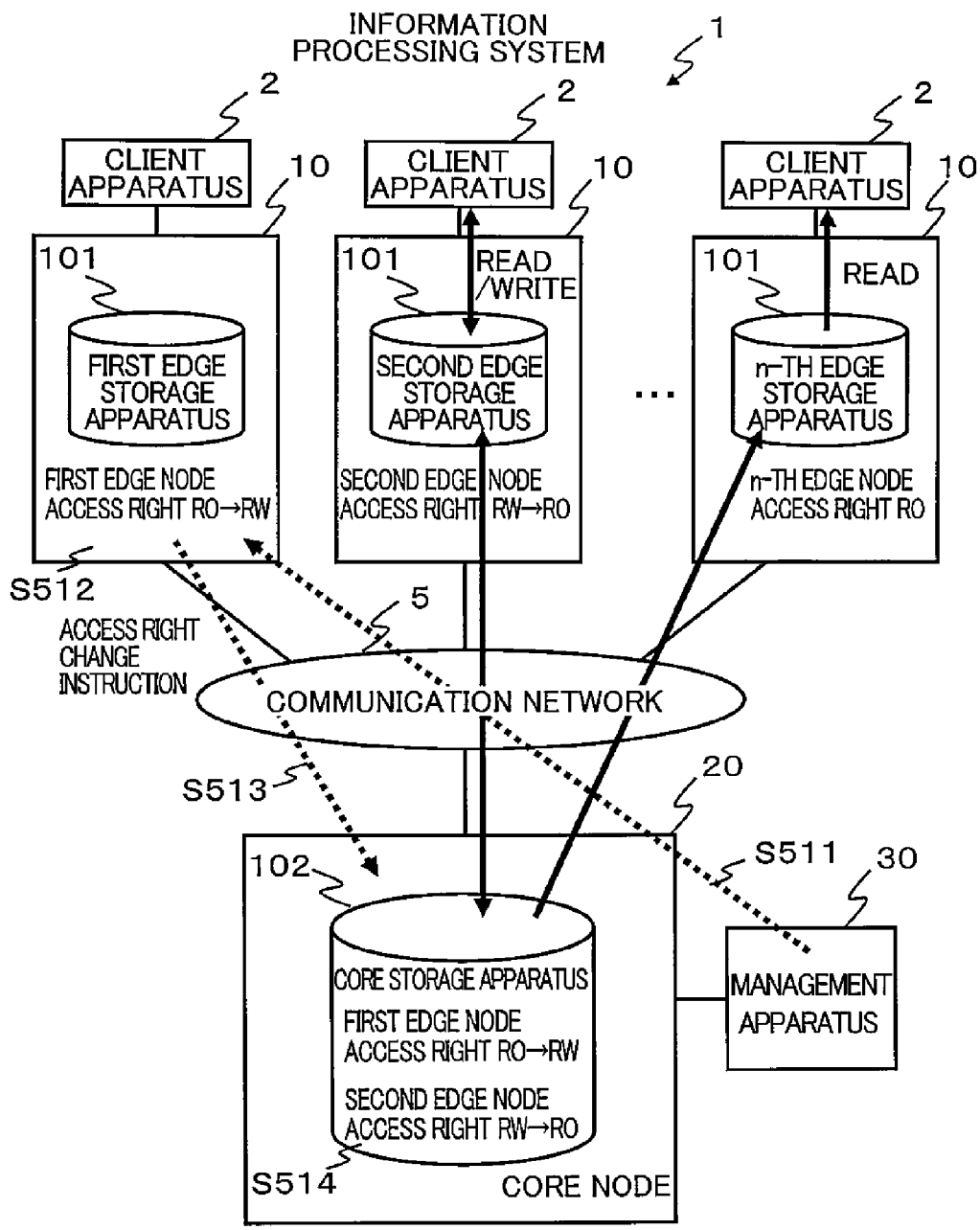
FIG. 5 is a diagram showing that, when the first edge node 10 has recovered from a failure, the access right "RW" granted to the second edge node 10 is taken over by the first edge node 10.

Thereafter, when the first edge node 10 has recovered from the failure, the second edge node 10 is taken over by the first edge node 10 (hereinafter also referred to as recovery). FIG. 5 shows operations in recovery. As shown in FIG. 5, first, in response to an instruction from the management apparatus 30 (hereinafter referred to as a third instruction) (S511) the first edge node 10 recovered from the failure changes its own access right from "RO" to "RW" (S512).

Then, at a timing when the second edge node 10 is not performing file data transfer to the core node 20, the first edge node 10 sends the core node 20 an instruction to set "RW" in its own access right (of the first edge node 10) managed by the core node 20 and to change the access right of the second edge node 10 managed by the core node 20 from "RW" to "RO" (hereinafter referred to as a fourth instruction) (S513).

Upon receipt of the fourth instruction, the core node 20 sets/changes the access rights of the first edge node 10 and the second edge node 10 managed by the core node 20 itself (S514). Then, after the above changes are completed, the first edge node 10 recovered from the failure starts operating as an edge node 10 granted the access right "RW." On the other hand, the second edge node 10 starts operating as an edge node 10 granted the access right "RO."

Thus, the information processing system 1 having a hierarchical file management structure including the plurality of edge nodes 10 and the core node 20 communicatively coupled to all the edge nodes 10 can make use of the foregoing mechanism as follows. Specifically, when a failure occurs in an edge node 10 granted the access right "RW" to permit update of files, the information processing system 1 can cause another edge node 10 granted the access right "RO" prohibiting file update to take over the function of the failed edge node 10 by upgrading the access right "RO" to the access right "RW."

Moreover, upon receipt of an instruction to change the access right from the edge node 10 of the successor, the core node 20 updates the access right of the edge node 10 of the successor stored in the core node 20 itself according to the instruction. Thus, the core node 20 can manage the access rights currently granted to the respective edge nodes 10. With this mechanism, an edge node 10 having a failure can be taken over by another edge node 10 surely.

In addition, during the normal period, the management apparatus 30 (or the core node 20) collects resource information of each edge node 10 and determines the aptitudes of the edge nodes 10 as a successor of the edge node 10 having a failure on the basis of the collected resource information to output the determination results of the aptitudes. Thus, when a failure occurs, an operator or the like can quickly complete takeover of the function of the edge node 10 having the failure by another edge node 10 by selecting the edge node 10 as the successor promptly and appropriately.

=Configuration of Information Processing System 1=

Hereinafter, detailed descriptions will be provided for the aforementioned configuration and operations of the information processing system 1.

Figure 6:
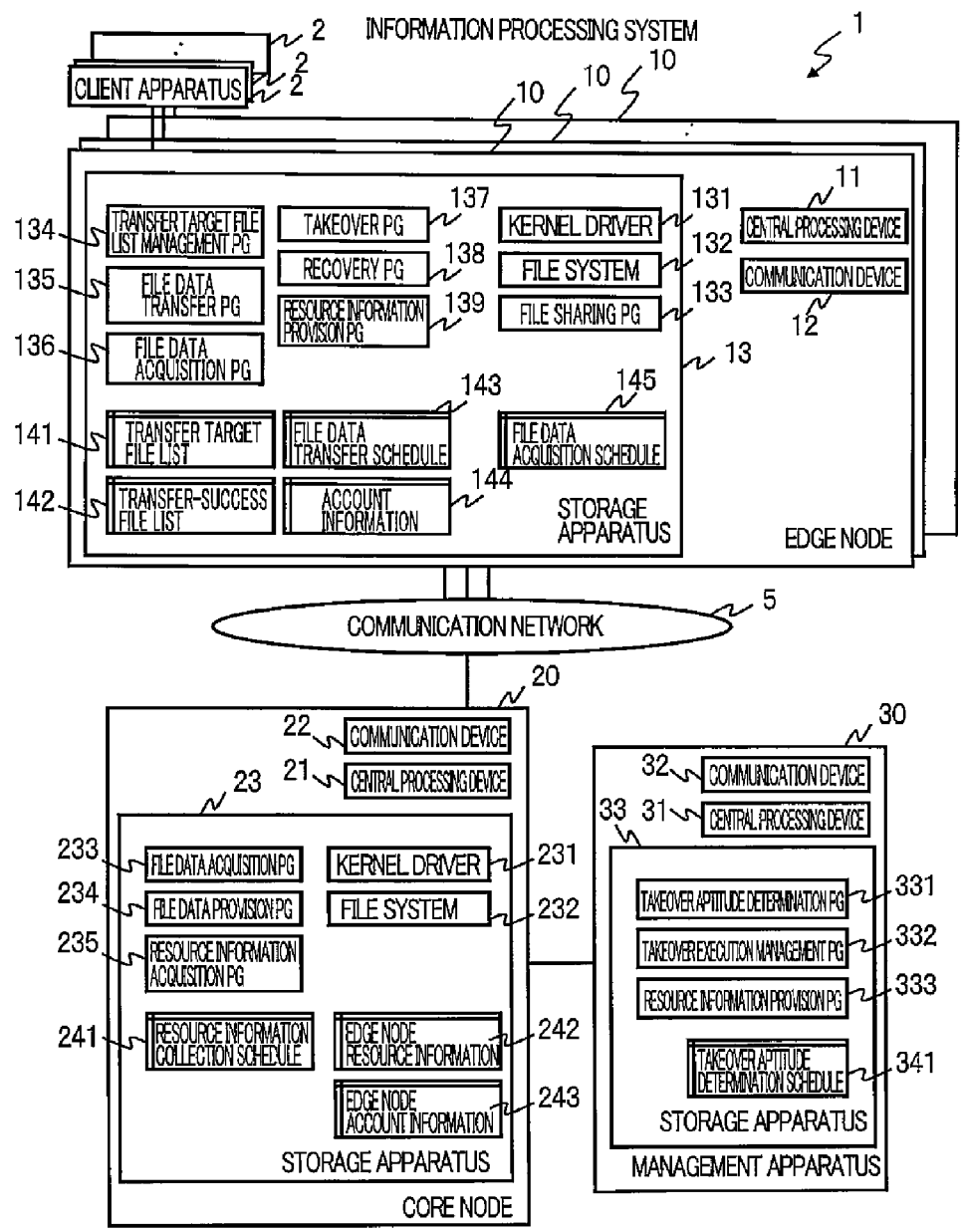
FIG. 6 is a diagram showing a configuration of the information processing system 1.

FIG. 6 shows a configuration of the information processing system 1. Although FIG. 6 shows a case where the management apparatus 30 is directly coupled to the core node 20 and communicates with the edge nodes 10 indirectly through the core node 20, a different configuration can be adopted in which the management apparatus 30 is coupled to the communication network 5 and communicates with the edge nodes 10 directly.

<Configuration of Edge Node>

As shown in FIG. 6, each of the edge nodes 10 includes a central processing device 11, a communication device 12 and a storage apparatus 13. The central processing device 11 is a device, such for example as a CPU or MPU, to read and execute programs stored in the storage apparatus 13. The communication device 12 is a NIC (Network Interface Card) or HBA (Host Bus Adaptor). The storage apparatus 13 includes a main storage device (a semiconductor memory (such as DRAM, EEPROM or NVRAM), and an external storage device (such as a hard disk drive, a semiconductor storage device (SSD: Solid State Drive), or an optical magnetic disk). The foregoing first edge storage apparatus 101, second edge storage apparatus 101, and third edge storage apparatus 101 are all implemented by the storage apparatuses 13.

In the case of the edge node 10 configured as a disk array apparatus, the edge node 10 further includes, for example, a high-speed data transfer device (DMA (Direct Memory Access)), a cache memory, a channel controller, a disk controller, a RAID (Redundant Arrays of Inexpensive Disk) controller, a high-speed communication switch (crossbar switch) and the like.

The storage apparatus 13 of the edge node 10 stores therein programs (hereinafter, a program will be abbreviated as PG) and various kinds of data for implementation of functions of the edge node 10.

As shown in FIG. 6, the storage apparatus 13 stores therein, as main programs, a kernel driver 131, a file system 132, a file sharing PG 133, a transfer target file list management PG 134, a file data transfer PG 135, a file data acquisition PG 136, a takeover PG 137, a recovery PG 138, and a resource information provision PG 139.

In addition, the storage apparatus 13 stores therein, as main data, a transfer target file list 141, a transfer-success file list 142, a file data transfer schedule 143, account information 144, and a file data acquisition schedule 145.

Among the main programs stored in the storage apparatus 13, the kernel driver 131 is a program to implement functions of an operation system and a device driver.

The file system 132 is a program to implement a data management function on a file basis (in units of files or units of directories). The file system 132 implements a filebased data management function using a mechanism such for example as FAT (File Allocation Table), NTFS, HFS (Hierarchical File System), ext2 (second extended file system), ext3 (third extended file system), or ext4 (fourth extended file system). Here, although not particularly shown in FIG. 6, the file data of files managed by the file system 132 are managed in the storage apparatus 13.

The file sharing PG 133 is a program to implement an environment for file sharing between the edge nodes 10 or between the edge nodes 10 and the core node 20. The file sharing PG 133 implements a file sharing environment using a mechanism such for example as NFS (Network File System), CIFS (Common Internet File System) or AFS (Andrew File System).

The transfer target file list management PG 134 is a program to implement a function of managing the transfer target file list 141 that is a file managed by the edge node 10 to manage the aforementioned transfer of file data (or update difference of file data otherwise) from the edge node 10 to the core node 20.

Among the main kinds of data stored in the storage apparatus 13, the transfer target file list 141 is used to manage information identifying a file whose file data needs to be transferred from the edge node 10 to the core node 20.

The file data transfer PG 135 is a program to implement a function of transferring the file data of a file managed in the transfer target file list 141 from the edge node 10 to the core node 20.

The file data acquisition PG 136 is a program to implement functions of acquiring file data from the core node 20 and storing the file data into its own storage apparatus 101 (storage apparatus 13).

The takeover PG 137 is a program to implement a function of allowing the edge node 10 itself to take over processing assigned to an edge node 10 having a failure.

The recovery PG 138 is a program to implement a function with which, for restoration of the edge node 10 recovered from a failure, the edge node 10 takes over the access right from an edge node 10 of the successor currently granted the access right "RW," and starts operating as the edge node 10 granted the access right "RW" again.

The resource information provision PG 139 is a program to implement a function of providing the aforementioned resource information of the edge node 10 to the management apparatus 30.

The transfer-success file list 142 is used to manage a list of files whose file data is successfully transferred by the data transfer PG 136 from the edge node 10 to the core file.

The file data transfer schedule 143 is data managed by an edge node 10 having the access right "RW." The file data transfer schedule 143 is used to manage information (schedule) indicating a timing at which the edge node 10 is scheduled to transfer updated file data to the core node 20.

The account information 144 is used to manage authentication information (an account name, a password and the like) necessary for the edge node 10 to access the core node 20, and the access right currently granted to the edge node 10.

The file data acquisition schedule 145 is used to manage information (schedule) indicating a timing at which the edge node 10 is scheduled to acquire, from the core node 20, file data transferred from the edge node 10.

<Configuration of Core Node>

As shown in FIG. 6, the core node 20 includes a central processing device 21, a communication device 22 and a storage apparatus 23. The central processing device 21 is, for example, a CPU or MPU. The communication device 22 is, for example, a NIC or HBA. The storage apparatus 23 is, for example, a semiconductor memory, a hard disk drive, or a semiconductor storage device. The aforementioned core storage apparatus 102 is implemented by using the storage apparatus 23.

In the case of the core node 20 configured as a disk array apparatus, the core node 20 further includes, for example, a high-speed data transfer device (DMA), a cache memory, a channel controller (communication processor and protocol processor), a disk controller (drive controller), a RAID controller, a high-speed communication switch (crossbar switch or the like) and the like.

The storage apparatus 23 of the core node 20 stores therein programs and various kinds of data for implementation of functions of the core node 20 by the central processing device 21.

As shown in FIG. 6, the storage apparatus 23 stores therein, as main programs, a kernel driver 231, a file system 232, a file data acquisition PG 233, a file data provision PG 234, and a resource information acquisition PG 235. In addition, the storage apparatus 23 stores therein, as main data, a resource information collection schedule 241, edge node resource information 242 and edge node account information 243.

Among the main programs stored in the storage apparatus 23, the kernel driver 231 is a program to implement functions of an operation system and a device driver.

The file system 232 is a program to implement a data management function in units of files or units of directories. Specific examples of the file system 232 include FAT, NTFS, HFS, ext2, ext3, ext4, and the like. Here, although not shown in FIG. 6, the file data of files managed by the file system 232 are managed in the storage apparatus 23.

The file data acquisition PG 233 is a program to implement a function of receiving file data transferred from the edge node 10 and of storing the file data into the storage apparatus 23.

The file data provision PG 234 is a program to implement a function of sending file data stored in the storage apparatus 23 to an edge node 10 in response to a request from the edge node 10.

The resource information acquisition PG 235 is a program to implement a function of acquiring the resource information from each edge node 10.

Among the main kinds of data stored in the storage apparatus 23, the resource information collection schedule 241 is used to manage information (schedule) indicating a timing at which resource information acquisition PG 235 is scheduled to collect the resource information from each edge node 10

The edge node resource information 242 is used to manage the resource information acquired from the edge nodes 10 by the resource information acquisition PG 235.

The edge node account information 243 is used to manage the authentication information and the access right currently granted to each of the edge nodes 10.

<Configuration of Management Apparatus>

As shown in FIG. 6, the management apparatus 30 includes a central processing device 31, a communication device 32 and a storage apparatus 33. The central processing device 31 is a device, such for example as a CPU or MPU, to read and execute programs stored in the storage apparatus 33. The communication device 32 is an NIC, for example.

The management apparatus 30 can acquire data stored in the storage apparatus 23 of the core node 20 by means of the communication device 32 communicating with the core node 20. The storage apparatus 33 is a semiconductor memory, a hard disk drive or a semiconductor storage device, for example.

Although the core node 20 and the management apparatus 30 are described as separate hardware units in this embodiment, the core node 20 and the management apparatus 30 may be configured as a single hardware unit.

The storage apparatus 33 of the management apparatus 30 stores therein programs and various kinds of data for implementing functions of the management apparatus 30.

As shown in FIG. 6, the storage apparatus 33 stores therein, as main programs, a takeover aptitude determination PG 331, a takeover execution management PG 332, a resource information provision PG 333 and the like. In addition, the storage apparatus 33 stores therein a takeover aptitude determination schedule 341 as main data.

Among the main programs stored in the storage apparatus 33, the takeover aptitude determination PG 331 is a program to implement functions of determining, based on edge node resource information 242 stored in the core node 20, the aptitude of each of the edge nodes 10 other than the edge node 10 granted the access right "RW" as a successor of the edge node 10 granted the access right "RW," and providing the determination results of the aptitudes to an operator or the like.

The takeover execution management PG 332 is a program to implement functions of receiving a designation of a successor from an operator or the like, and controlling and monitoring processing performed in the aforementioned takeover or recovery by the edge nodes 10 and the core node 20.

The resource information provision PG 333 is a program to implement a function of providing the operator or the like with information based on the edge node resource information 242 of the core node 20.

The takeover aptitude determination schedule 341 is used to manage information (schedule) indicating a timing at which the management apparatus 30 is scheduled to determine the aptitude that each of the edge nodes 10 other than the edge node 10 granted the access right "RW" has as the successor of the edge node 10 granted the access right "RW."

Here, during execution of the programs, the management apparatus 30 accesses data (the edge node resource information 242, the edge node account information 243 and the like) stored in the storage apparatus 23 of the core node 20 whenever necessary. Instead, the management apparatus 30 may be configured to store these kinds of data in the storage apparatus 33.

=Description of Processing=

Next, descriptions will be provided for processing performed in the information processing system 1. Processing performed by the information processing system 1 during the normal period will be explained first, and thereafter processing performed by the information processing system 1 when the edge node 10 granted the access right "RW" has a failure will be explained.

1. Processing in Normal Period 1-1. File Reference Processing

Figure 7:
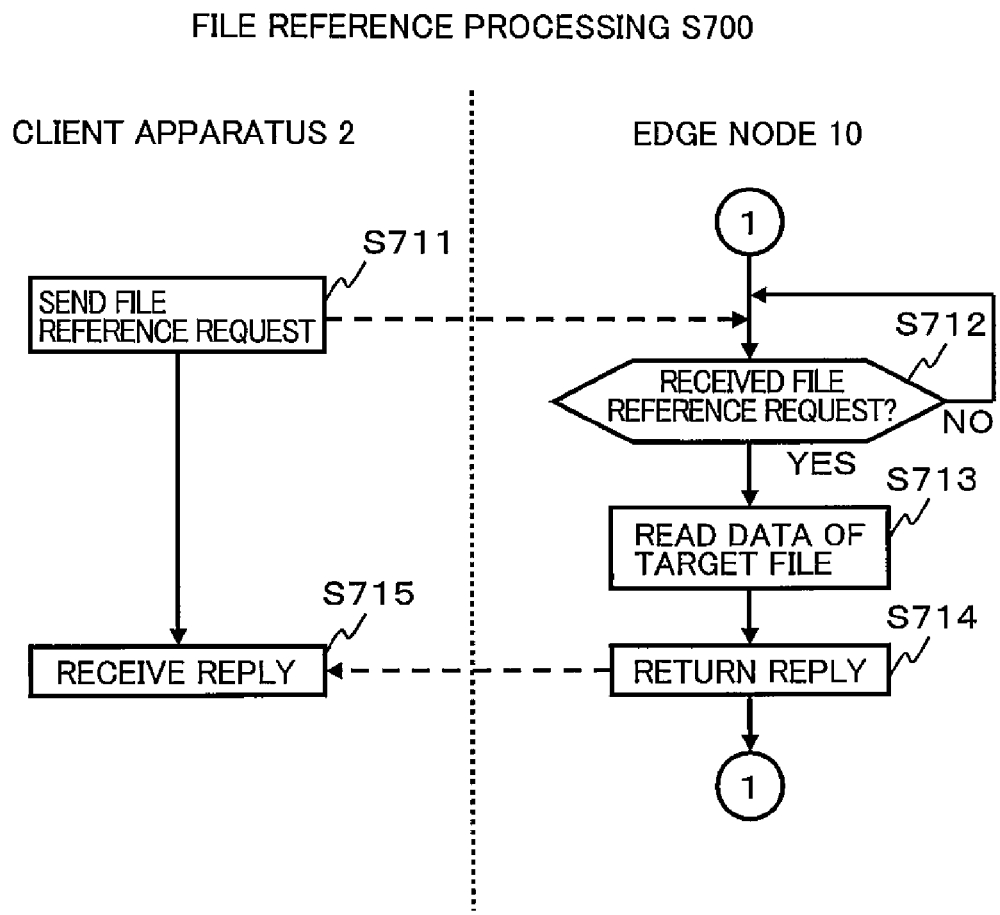
FIG. 7 is a flowchart for explaining file reference processing S700.

FIG. 7 is a flowchart for explaining processing performed during the normal period by the information processing system 1 when the edge node 10 receives a file reference request sent from the client apparatus 2 (hereinafter this processing will be referred to as file reference processing S700).

As shown in FIG. 7, when receiving a file reference request from the client apparatus 2 (S711, S712), the edge node 10 reads the file data of the file designated in the reference request (S713), generates a reply based on the read file data, and sends the reply to the client apparatus 2 (S714, S715).

1-2. File Update Processing

Figures 8, 9:
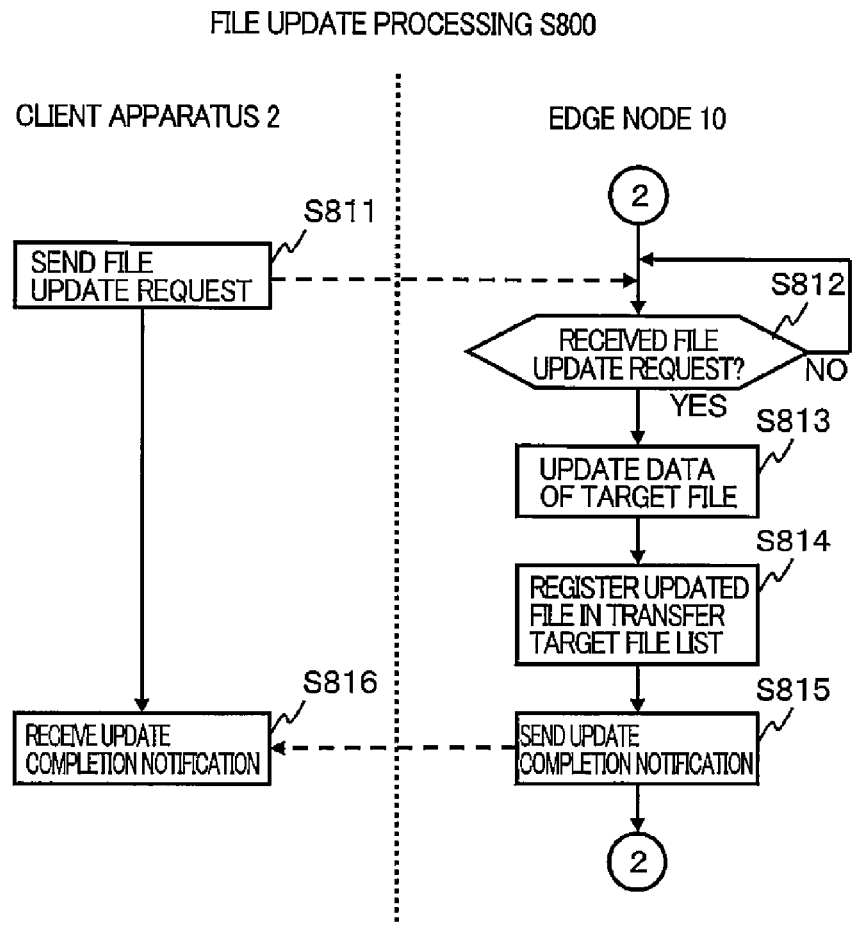
FIG. 8 is a flowchart for explaining file update processing S800.
FIG. 9 shows an example of a transfer target file list 141.

FIG. 8 is a flowchart for explaining processing performed during the normal period by the information processing system 1 when the edge node 10 having the access right set to "RW" receives a file update request (including a new file creation request) from the client apparatus 2 (hereinafter this processing will be referred to as file update processing S800).

As shown in FIG. 8, when receiving a file update request from the client apparatus 2 (S811, S812), the edge node 10 updates the file data of the file designated in the update request (the file data stored in the edge storage apparatus 101) (when receiving a new file creation request, the edge node 10 creates file data and stores the file data in the edge storage apparatus 101) (S813). At this time, the edge node 10 registers information identifying the updated file in the transfer target file list 141 (S814).

FIG. 9 shows an example of the transfer target file list 141. As shown in FIG. 9, in the transfer target file list 141, an identifier of an updated file (path name, file name and the like) is registered as the information identifying the updated file. Although not shown in FIG. 9, file attribute information such as a timestamp indicating the last update date/time of each file is also registered in the transfer target file list 141.

Returning to FIG. 8, the edge node 10 then sends the client apparatus 2 a notification that the file update is completed (S815, S816). Then, the processing returns to S812.

1-3. File Data Transfer Processing

Figure 10:
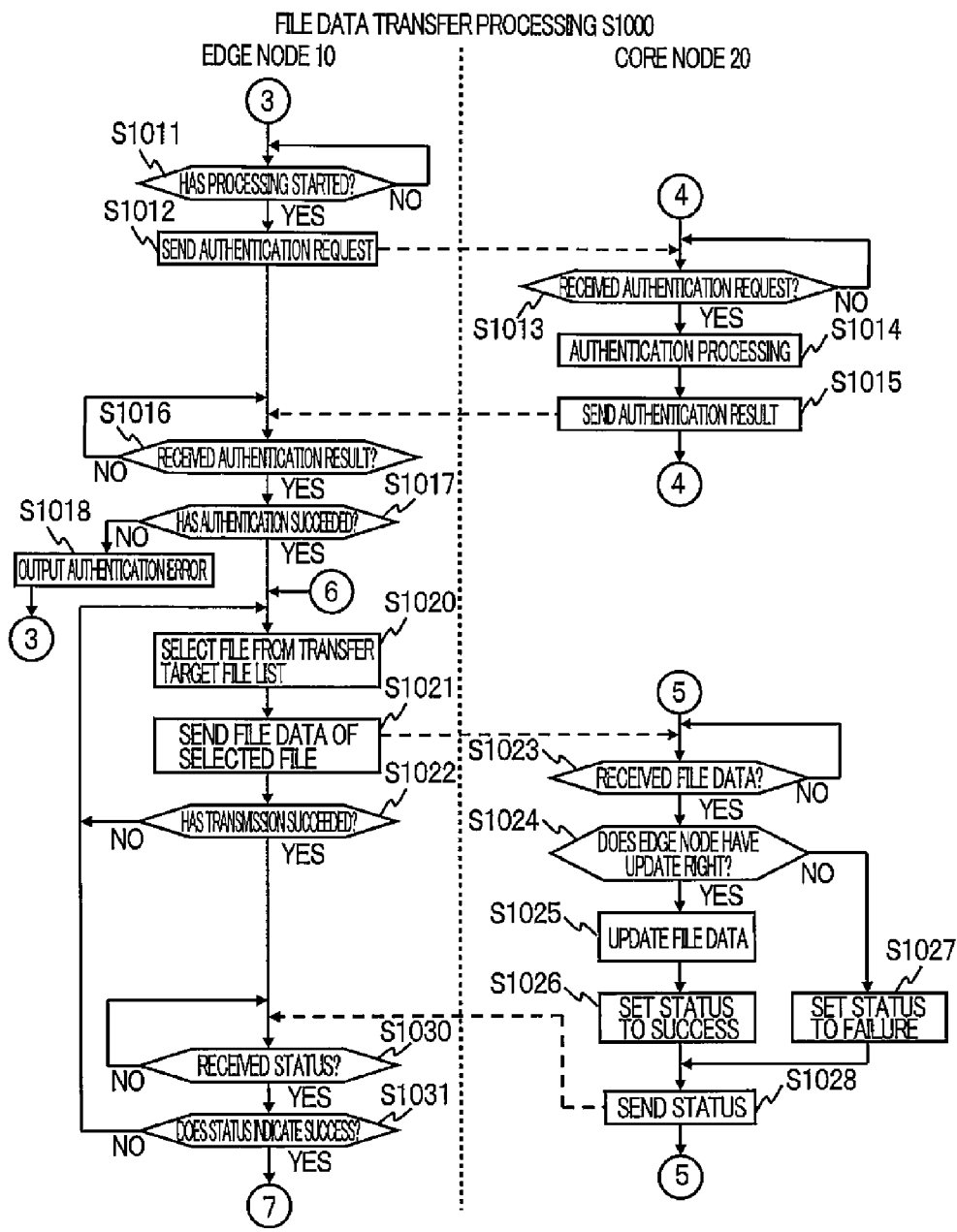
FIG. 10 is a flowchart for explaining file data transfer processing S1000.
Figure 11:
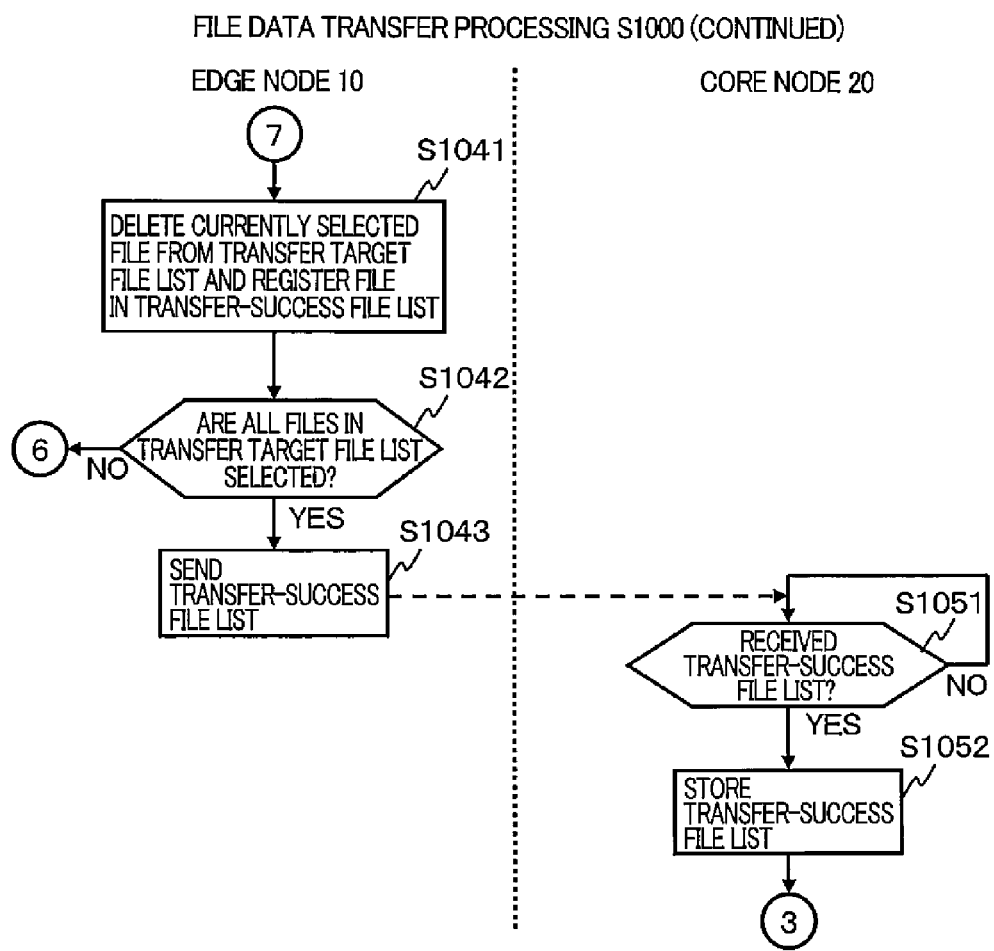
FIG. 11 is a flowchart for explaining the file data transfer processing S1000 (continued from FIG. 10).

FIGS. 10 and 11 show a flowchart for explaining processing performed by the information processing system 1 when the edge node 10 having the access right set to "RW" transfers the file data of files registered in the transfer target file list 141 to the core node 20 (hereinafter this processing will be referred to as file data transfer processing S1000).

The file data transfer processing S1000 is executed according to the set value of the file data transfer schedule 143, and, for example, is executed with an arrival of a predetermined timing as a trigger (at an arrival of a scheduled time, at predetermined time intervals, or the like). Note that the timing at which file data is updated and the timing at which the file data transfer processing S1000 is executed are not necessarily synchronous with each other.

As shown in FIG. 10, when the file data transfer processing S1000 starts (S1011: YES), the edge node 10 firstly sends an authentication request to the core node 20 (S1012). The authentication request thus sent accompanied by authentication information (an account name 1441 and a password 1442 in the account information 144).

When receiving the authentication request from the edge node 10 (S1013: YES), the core node 20 checks the received authentication information against the contents in the edge node account information 243 stored by the core node 20 itself, determines whether the authentication information received from the edge node 10 is valid or not, and returns the authentication result to the edge node 10 (S1014, S1015). Note that the authentication before file data transfer is made in order to prevent a fraudulent access to the core storage apparatus 102.

FIG. 12 shows an example of the account information 144 managed by the edge node 10, and FIG. 13 shows an example of the edge node account information 243 managed by the core node 20. As shown in FIGS. 12 and 13, each record of the account information 144 and the edge node account information 243 includes items of an account name 1441 (account name 2431), a password 1442 (password 2432), and an access right 1443 (access right 2433).

Among these items, the account name 1441 (account name 2431) is set with an identifier assigned uniquely to each edge node 10 (hereinafter referred to as an account name). The password 1442 (password 2432) is set with a password to be used in combination with the account name. The access right 1443 (access right 2433) is set with an access right currently granted to the edge node 10.

Returning to FIG. 10, when receiving the authentication result (S1016), the edge node 10 checks whether the authentication has been successful or not. When the authentication has been successful (S1017: YES), the processing advances to S1020. When the authentication had failed (S1017: NO), the edge node 10 outputs an authentication error (S1018), and the processing returns to S1011 in this case.

The edge node 10 selects a file from the transfer target file list 141 in S1020 and sends the file data of the selected file to the core node 20 (S1021). Here, the edge node 10 adds its own account name to the file data sent at this time.

Thereafter, the edge node 10 monitors the transfer state of the file data. When detecting that the sending of the file data had failed during the transfer (S1022: NO), the edge node 10 selects another file from the transfer target file list 141, and starts sending the file data again (S1020, S1021).

On the other hand, when receiving the file data from the edge node 10 (S1023), the core node 20 checks the account name accompanying the file data against the edge node account information 243, and determines whether or not the edge node 10 currently has a right to update file data (whether the access right of the edge node 10 is "RW" or not) (S1024).

When the edge node 10 is determined as having the right to update file data (S1024: YES), the core node 20 updates the file data of the target file stored in the core storage apparatus 102 on the basis of the received file data (creates file data and stores the file data in the core storage apparatus 102 in the case of new file creation) (S1025). Then, the core node 20 returns a notification (hereinafter also referred to as a status) indicating that the update to the edge node 10 has been successful (S1025, S1026, S1028).

In contrast, when the edge node 10 is determined as not having the right to update file data (S1024: NO), the core node 20 returns notification (status) indicating a failure of the update of the file data to the edge node 10 (S1027, S1028).

When receiving the notification (status) from the core node 20 (S1030: YES), the edge node 10 checks whether or not the update of the file data has been successful in the core node 20 (S1031). When the update of the file data has been successful (S1031: YES), the processing advances to S1041 in FIG. 11. When the update of the file data has failed (S1031: NO), the processing returns to S1020 and the edge node 10 selects another file and attempts to transfer the data file again.

In S1041 in FIG. 11, the edge node 10 deletes the currently-selected file from the transfer target file list 141 and registers the currently-selected file in the transfer-success file list 142.

FIG. 14 shows an example of the transfer-success file list 142. As shown in FIG. 14, an identifier (the path name, the file name and the like of the file) of a file successfully transferred to the core node 20 is registered in the transfer-success file list 142. Although not shown in FIG. 14, attribute information such as a timestamp indicating the last update date/time of each file is also registered in the transfer-success file list 142.

Returning to FIG. 11, the edge node 10 subsequently determines whether or not all the files registered in the transfer target file list 141 are already selected (S1042). When it is determined that there is a file yet to be selected (S1042: NO), the processing returns to S1020, and the edge node 10 selects another file from the transfer target file list 141 and starts transferring the file data.

On the other hand, when it is determined that all the files have been selected (S1042: YES), the edge node 10 sends the core node 20 the transfer-success file list 142 at this time point (S1043).

When receiving the transfer-success file list 142 from the edge node 10 (S1051: YES), the core node 20 stores the received transfer-success file list 142 into the core storage apparatus 102 (S1052).

In the foregoing file data transfer processing S1000, the entire file data of an updated file is sent from the edge node 10 to the core node 20. Instead, if the file data of the file before update exists in the core node 20, only an update difference of the file data may be sent from the edge node 10 to the core node 20 and may be reflected in the file data existing in the core node 20. With this configuration, a communication load relating to the data transfer can be reduced.

In addition, in a case where low use files (for example, files never accessed within a predetermined latest period of time) need to be deleted from the edge node 10 due to shortage of availability of the external storage device constituting the storage apparatus 13 of the edge node 10, a file already transferred to the core node 20 may be deleted from the edge node 10 prior to deletion of a file yet to be transferred to the core node 20. Moreover, in deleting file data from the edge node 10, only the entity data of the file data may be deleted while the metadata thereof is left in the edge node 10. In this way, the edge node 10 can return a reply to the client apparatus 2 in response to a request not needing the entity data.

1-4. File Data Acquisition Processing

Figure 15:
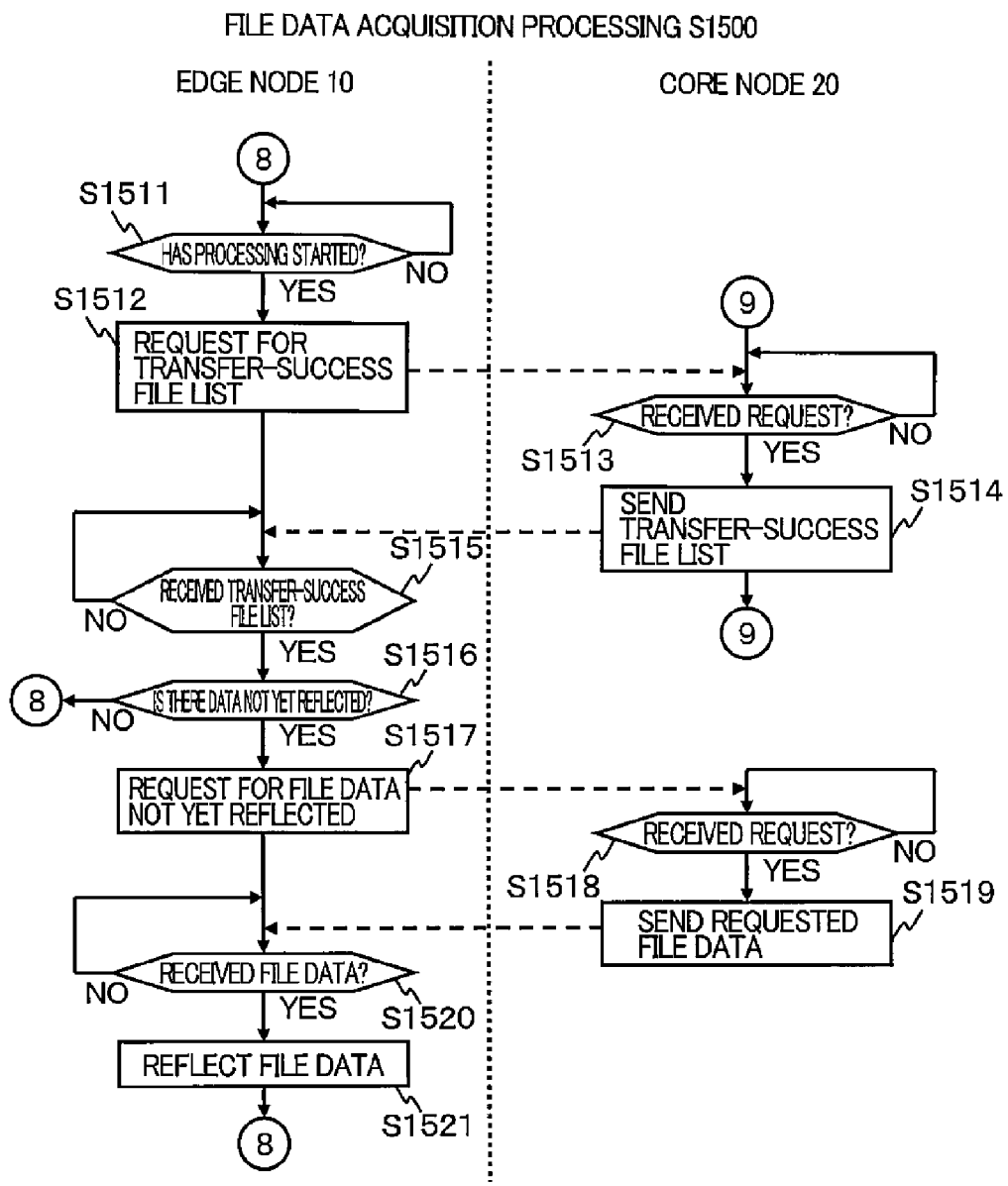
FIG. 15 is a flowchart for explaining file data acquisition processing S1500.

FIG. 15 is a flowchart for explaining processing performed by the information processing system 1 when the edge node 10 having the access right set to "RO" acquires updated file data transferred to the core node 20 in the file data transfer processing S1000 (hereinafter this processing will be referred to as file data acquisition processing S1500).

The file data acquisition processing S1500 is executed by each of the edge nodes 10 individually. The file data acquisition processing S1500 is executed according to the set value of the file data acquisition schedule 145, and for example is executed with an arrival of a predetermined timing as a trigger (at an arrival of a scheduled time, at predetermined time intervals, or the like).

As shown in FIG. 15, when the file data acquisition processing S1500 starts (S1511: YES), the edge node 10 sends the core node 20 a request for the transfer-success file list 142 (S1512).

When receiving the request (S1513: YES), the core node 20 sends the transfer-success file list 142 to the edge node 10 (S1514).

When receiving the transfer-success file list 142 from the core node 20 (S1515: YES), the edge node 10 determines whether or not the received transfer-success file list 142 includes a file whose file data is yet to be reflected in the edge node 10 itself (file data not yet reflected in the edge storage apparatus 101) (S1516). The edge node 10 makes this judgment by comparing the timestamp of a file stored in the edge storage apparatus 101 and the timestamp of the file registered in the transfer-success file list 142, for example.

When it is determined that there is no file data yet to be reflected (S1516: NO), the processing returns to S1511. On the other hand, when it is determined that there is file data yet to be reflected (S1516: YES), the edge node 10 sends the core node 20 a request for the file data yet to be reflected in itself (S1517).

When receiving the request (S1518: YES), the core node 20 sends the edge node 10 the file data designated in the request (S1519).

When receiving the file data from the core node 20 (S1520: YES), the edge node 10 reflects the received file data in the file stored in the edge storage apparatus 101 of the edge node 10 (newly stores the file data in the edge storage apparatus 101 in the case of new file creation) (S1521). Then, the processing returns to S1511.

In the foregoing file data acquisition processing S1500, the entire file data is sent from the core node 20 to the edge node 10. Instead, if the file data of the file before update exists in the edge node 10, only update difference of the file data may be sent from the core node 20 to the edge node 10 and may be reflected in the file data existing in the edge node 10. With this configuration, a communication load relating to the file data transfer can be reduced.

1-5. Resource Information Collection Processing

Figure 16:
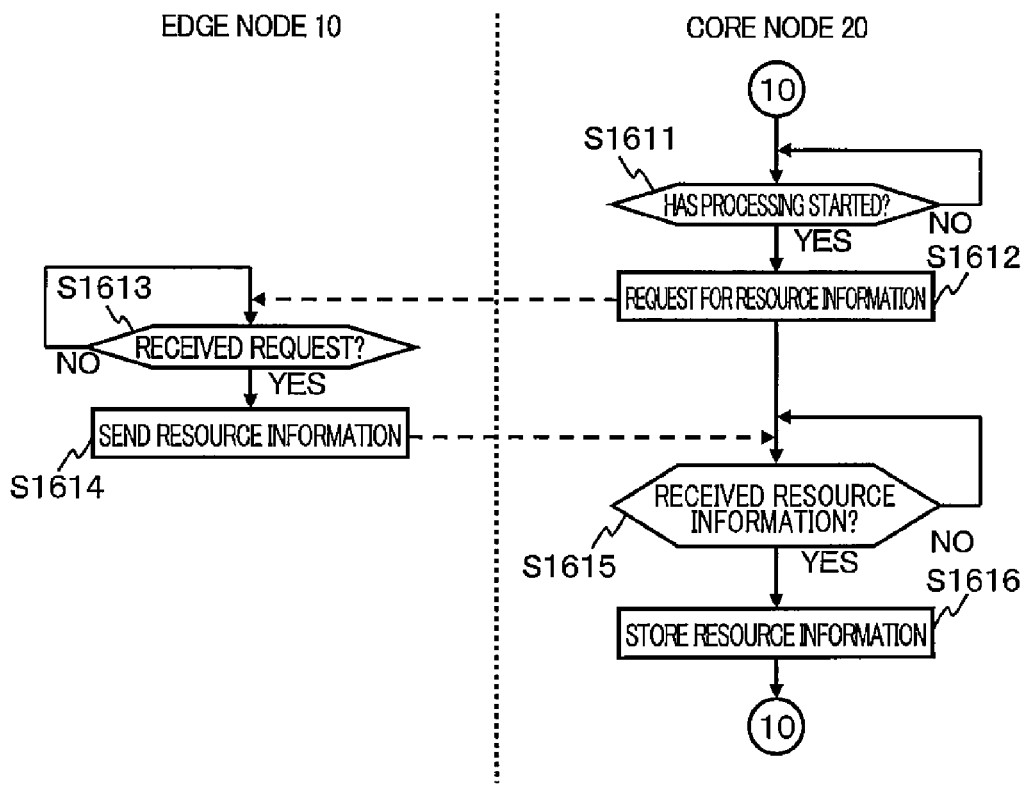
FIG. 16 is a flowchart for explaining resource information collection processing S1600.

FIG. 16 is a flowchart for explaining processing performed by the information processing system 1 when the core node 20 collects the resource information from the edge nodes 10 (hereinafter this processing will be referred to as resource information collection processing S1600).

The resource information collection processing S1600 is executed according to the resource information collection schedule 241, and, for example, is executed with an arrival of a predetermined timing as a trigger (at an arrival of a scheduled time, at predetermined time intervals, or the like).

As shown in FIG. 16, when the resource information collection processing S1600 starts (S1611: YES), the core node 20 sends each of the edge nodes 10 a request for the resource information (S1612).

When receiving the request (S1613: YES), each of the edge nodes 10 sends its own resource information to the core node 20 (S1614).

When receiving the resource information from the edge node 10 (S1615: YES), the core node 20 stores the received resource information as the edge node resource information 242 (S1616).

In the foregoing resource information collection processing S1600, the core node 20 collects the resource information from each of the edge nodes 10, but instead, the management apparatus 30 may collect the resource information from each of the edge nodes 10.

FIG. 17 shows an example of the edge node resource information 242. As shown in FIG. 17, the edge node resource information 242 is a set of records each having items of an edge node ID 2421, an access right 2422, an operation status 2423, CPU information 2424, main storage device information 2425, communication device information 2426, external storage device information 2427, a priority 2428, and a takeover aptitude 2429.

Among the items, the edge node ID 2421 is set with an identifier assigned uniquely to each of the edge nodes 10 (hereinafter referred to as an edge node ID).

The access right 2422 is set with an access right currently granted to the edge node 10.

The operation status 2423 is set with information indicating the operation status of the edge node 10 ("Active" indicating that the edge node 10 is operating or "Inactive" indicating that the edge node 10 is stopped).

The CPU information 2424 is set with information on the central processing device 11 included in the edge node 10, i.e., the performance (for example, the maximum operating frequency, the number of cores, the model number, and the like), and a utilization (hereinafter also referred to as CPU utilization) of the central processing device 11. The CPU utilization is, for example, the mean value of the utilizations of the central processing device 11 within a predetermined past period of time.

The main storage device information 2425 is set with information on the main storage device in the storage apparatus 13 of the edge node 10, i.e., the total capacity of the main storage device and a utilization of the storage area in the main storage device (hereinafter also referred to as main storage device utilization). The main storage device utilization is the mean value of the utilizations of the storage area in the main storage device within a predetermined past period of time, for example.

The communication device information 2426 is set with information indicating a transmission capacity of the communication device 12 of the edge node 10 and a utilization of a communication line (or a communication port) included in the communication device 12 (hereinafter referred to as communication device utilization). The communication device utilization is, for example, the mean value of the utilizations of the communication line (or the communication port) included in the communication device 12 within a predetermined past period of time.

The external storage device information 2427 is set with information on the external storage device in the storage apparatus 13 of the edge node 10, i.e., the total capacity of the external storage device and a utilization of the storage area in the external storage device (hereinafter also referred to as external storage device utilization). The external storage device utilization is, for example, the mean value of the utilizations of the storage area in the external storage device within a predetermined past period of time.

The priority 2428 is set with information indicating execution priority for determining the takeover aptitude of each of the edge nodes 10 (that is takeover aptitude deteimination processing S1800 to be described later). The information on the execution priority is received from the operator or the like. When the takeover aptitude determination processing S1800 is executed in order of the contents in the priority 2428, the aptitude of an edge node 10 expected to serve as the successor by the operator or the like, for example, can be determined preferentially. This increases the possibility that the aptitude of the edge node 10 set with a high priority is already determined by the time an edge node 10 granted the access right "RW" has a failure. Thus, upon occurrence of a failure, the operator or the like can determine the edge node 10 as the successor and complete the takeover quickly.

The takeover aptitude 2429 is set with information indicating the takeover aptitude of each edge node 10 determined in the takeover aptitude determination processing S1800 to be described later. The information indicating the takeover aptitude is, for example, "Good" indicating that the edge node 10 can provide services at a higher level than the predecessor and therefore has a high aptitude as the successor, "Fair" indicating that the edge node 10 can provide services at a similar level as the predecessor, "Not Recommended" indicating that the edge node 10 cannot provide services at a similar level as the predecessor and therefore has a low aptitude as the successor.

1-6. Takeover Aptitude Determination Processing

The management apparatus 30 determines the aptitude (hereinafter also referred to as a takeover aptitude) that each edge node 10 having the access right "RO" has as a successor of an edge node 10 having the access right "RW" (hereinafter also referred to as a predecessor edge node 10) on the basis of the resource information stored in the core node 20.

Figure 18:
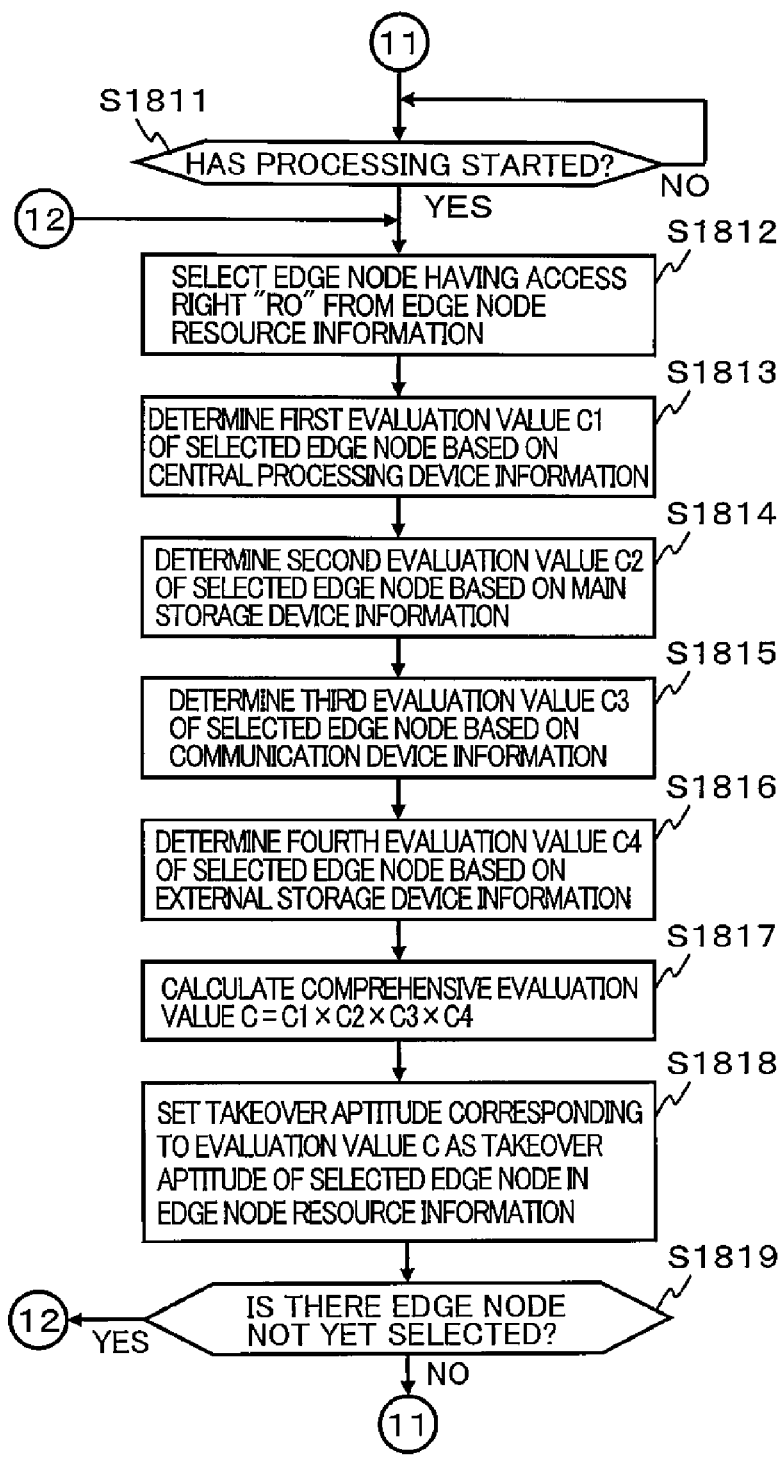
FIG. 18 is a flowchart for explaining takeover aptitude determination processing S1800.

FIG. 18 is a flowchart for explaining processing performed by the management apparatus 30 (or the core node 20) to determine the takeover aptitude (hereinafter this processing will be referred to as the takeover aptitude determination processing S1800). The takeover aptitude determination processing S1800 is executed according to the takeover aptitude determination schedule 341, and for example is executed with an arrival of a predetermined timing as a trigger (at an arrival of a scheduled time, at predetermined time intervals, or the like).

Note that the takeover aptitude determination processing S1800 is executed repetitively at short time intervals during the normal period. Through repetitive execution, the takeover aptitude of each edge node 10 is continuously updated to the aptitude determined based on the latest resource information. Hence, after a failure occurs in the edge node 10 having the access right "RW," the operator or the like can appropriately select an edge node 10 as the successor on the basis of the takeover aptitudes determined at a time point close before the occurrence of the failure.

When the takeover aptitude determination processing S1800 starts (S1811: YES), the management apparatus 30 first selects one edge node 10 granted the access right "RO" from the edge node resource information 242 (S1812). In this selection, the edge node 10 suspected to have a failure (communication failure, damage, or the like) on the basis of the content in the edge node resource information 242 may be excluded from selection targets. In addition, this selection may be made in order of the set values in the aforementioned priority 2426 of the edge node resource information 242.

Next, the management apparatus 30 determines a first evaluation value C1 of the edge node 10 selected in S1812 (hereinafter referred to as the selected edge node 10) by comparing between the contents in the central processing device information 2424 of the selected edge node 10 in the edge node resource information 242 and the contents in the central processing device information 2424 of the edge node 10 granted the access right "RW" in the edge node resource information 242 (S1813).

More specifically, for example, the management apparatus 30 when setting as a reference (100%), an evaluation index of the edge node 10 granted the access right "RW" that is calculated from the processing capability and the CPU utilization of the central processing device 11, and calculates an evaluation index S1 of the selected edge node 10 from the processing performance and the CPU utilization of the central processing device 11 of the selected edge node 10. Then, the management apparatus 30 determines "2" as the first evaluation value C1 when the evaluation index S1 is equal to or greater than 120% of the reference, determines "1" as the first evaluation value C1 when the evaluation index S1 is less than 120% but not less than 90% of the reference, and determines "0" as the first evaluation value C1 when the evaluation index S1 is less than 90% of the reference.

Subsequently, the management apparatus 30 determines a second evaluation value C2 of the selected edge node 10 by comparing between the contents in the main storage device information 2425 of the selected edge node 10 in the edge node resource information 242 and the contents in the main storage device information 2425 of the edge node 10 granted the access right "RW" in the edge node resource information 242 (S1814).

More specifically, for example, the management apparatus 30 when setting as a reference (100%), an evaluation index of the edge node 10 granted the access right "RW" calculated from the maximum storage capacity and the main storage device utilization of the main storage device, and calculates an evaluation index S2 of the selected edge node 10 from the total capacity and the main storage device utilization of the main storage device of the selected edge node 10. Then, the management apparatus 30 determines "2" as the second evaluation value C2 when the evaluation index S2 is equal to or greater than 120% of the reference, determines "1" as the second evaluation value C2 when the evaluation index S2 is less than 120% but not less than 90% of the reference, and determines "0" as the second evaluation value C2 when the evaluation index S2 is less than 90% of the reference.

Thereafter, the management apparatus 30 determines a third evaluation value C3 of the selected edge node 10 by comparing between the contents in the communication device information 2426 of the selected edge node 10 in the edge node resource information 242 and the contents in the communication device information 2426 of the edge node 10 granted the access right "RW" in the edge node resource information 242 (S1815).

More specifically, for example, the management apparatus 30 when setting as a reference (100%), an evaluation index of the edge node 10 granted the access right "RW" calculated from the transmission capacity and the communication utilization in the communication device information 2426 of the communication device 12, and calculates an evaluation index S3 of the selected edge node 10 from the transmission capacity and the communication utilization of the communication device 12 of the selected edge node 10. Then, the management apparatus 30 determines "2" as the third evaluation value C3 when the evaluation index S3 is equal to or greater than 120% of the reference, determines "1" as the third evaluation value C3 when the evaluation index S3 is less than 120% but not less than 90% of the reference, and determines "0" as the third evaluation value C3 when the evaluation index S3 is less than 90% of the reference.

After that, the management apparatus 30 determines a fourth evaluation value C4 of the selected edge node 10 by comparing between the contents in the external storage device information 2427 in the edge node resource information 242 of the selected edge node 10 and the contents in the external storage device information 2427 of the edge node 10 granted the access right "RW" in the edge node resource information 242 (S1816).

More specifically, for example, the management apparatus 30 when setting as a reference (100%), an evaluation index of the edge node 10 granted the access right "RW" calculated from the maximum storage capacity and the external storage device utilization of the external storage device, and calculates an evaluation index S4 of the selected edge node 10 from the total capacity and the external storage device utilization of the external storage device of the selected edge node 10, for example. Then, the management apparatus 30 determines "2" as the fourth evaluation value C4 when the evaluation index S4 is equal to or greater than 120% of the reference, determines "1" as the fourth evaluation value C4 when the evaluation index S4 is less than 120% but not less than 90% of the reference, and determines "0" as the fourth evaluation value C4 when the evaluation index S4 is less than 90% of the reference.

Next, the management apparatus 30 calculates a comprehensive evaluation value C=C1×C2×C3×C4 based on the evaluation values (the first to fourth evaluation values C1 to C4) thus calculated (S1817), and determines the takeover aptitude based on the calculated comprehensive evaluation value C. Then, the management apparatus 30 sets the determined takeover aptitude as the takeover aptitude 2429 of the selected edge node 10 in the edge node resource information 242 (S1818).

Then, the management apparatus 30 determines whether or not there is an edge node 10 yet to be selected (S1819). When there is an edge node 10 yet to be selected (S1819: YES), the processing returns to S1812. When there is no edge node 10 yet to be selected (S1819: NO), the processing returns to S1811.

As described above, during the normal period, the management apparatus 30 (or the core node 20) collects resource information of the edge nodes 10, determines the aptitudes of the edge nodes 10 as the successor of the failed edge node 10 on the basis of the collected resource information, and outputs the determination results of the aptitudes. Thus, the operator or the like can select an edge node 10 appropriate as the successor of the failed edge node 10.

Note that, during the normal period, the management apparatus 30 (or the core node 20) also collects the resource information of the edge node 10 having the access right "RW," and determines the aptitude of each of the other edge nodes 10 as the successor by using as a reference the latest resource information of the edge node 10 having the access right "RW." Thus, the management apparatus 30 can accurately determine the aptitudes of the other edge nodes 10 as the successor.

Moreover, as described above, the management apparatus 30 displays the contents in the edge node resource information 242 set in the foregoing manner, for example, automatically or in response to a request from the operator or the like. Thus, during the normal period, the operator or the like can check whether or not an edge node 10 having an aptitude necessary as an edge node 10 of a successor candidate is prepared. Then, when necessary, the operator or the like can take necessary measurements such as resource enhancement and load balancing of the edge nodes 10, and thereby can always prepare and reserve an edge node 10 having an aptitude necessary as an edge node 10 of a successor candidate.

2. Processing at Occurrence of Failure

Hereinafter, descriptions will be provided for processing performed by the information processing system 1 when a failure occurs in an edge node 10 having the access right set to "RW."

2-1. Takeover Processing

Figure 19:
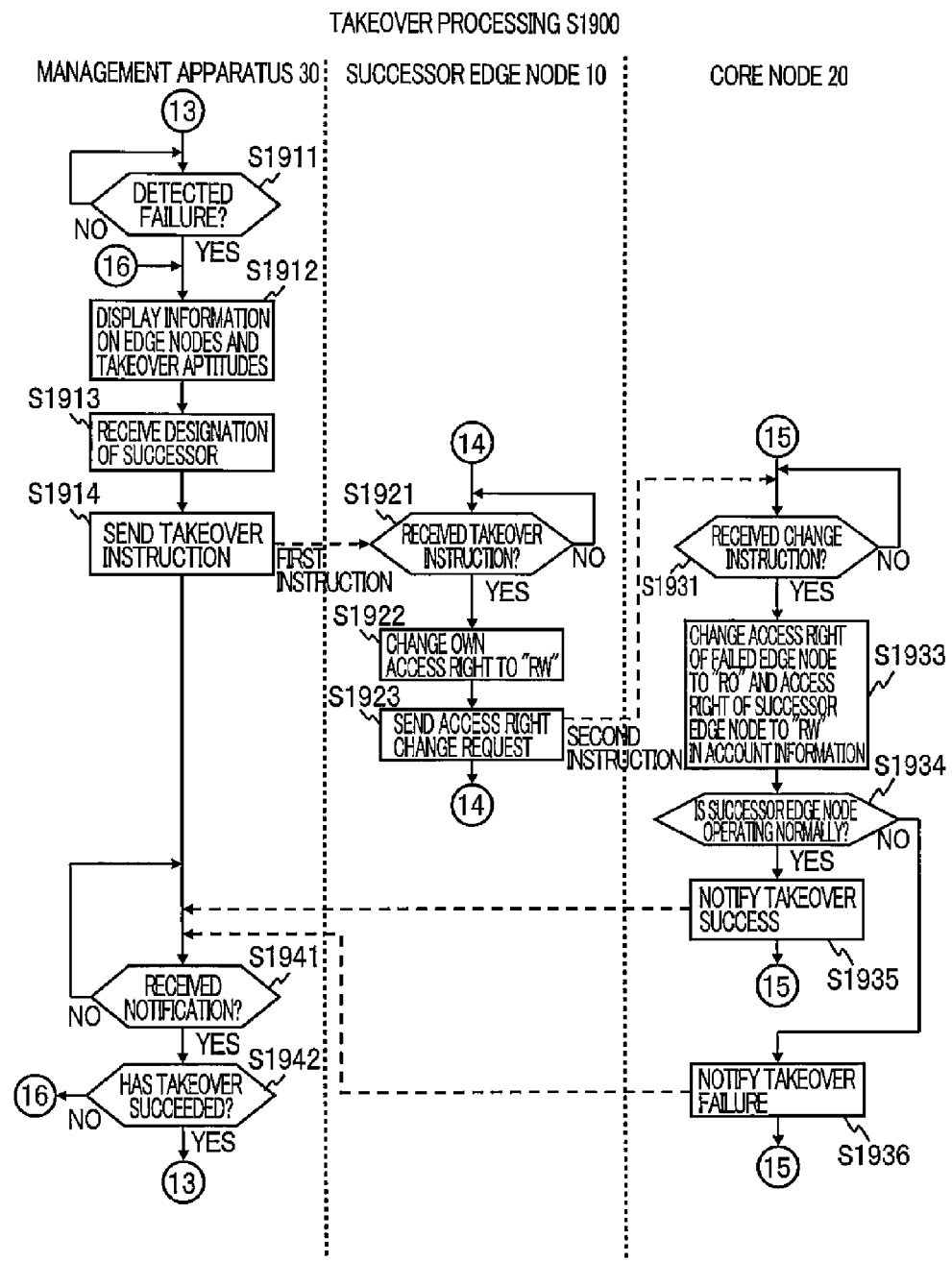
FIG. 19 is a flowchart for explaining takeover processing S1900.

FIG. 19 is a flowchart for explaining processing performed by the information processing system 1 when, upon occurrence of a failure in an edge node 10 granted the access right "RW" (hereinafter also referred to as a failed edge node 10), takeover from the failed edge node 10 by another edge node 10 granted the access right "RO" (hereinafter also referred to as a successor edge node 10) is performed (hereinafter this processing will be referred to as takeover processing S1900).

When detecting that the failed edge node 10 has a failure (S1911: YES), the management apparatus 30 displays a screen (a successor candidate selection screen 2000) (S1912) and receives a designation of the successor edge node 10 (S1913). The successor candidate selection screen 2000 displays the resource information of the edge nodes 10 on the basis of the contents of the edge node resource information 242 in which the management apparatus 30 updates the contents in the takeover aptitude 2429 by determining the takeover aptitudes during the normal period, and includes a column in which the operator or the like can mark to specify the selected successor candidate.

Here, the management apparatus 30 detects that the failed edge node 10 has the failure on the basis of the content in the edge node resource information 242, for example. Also, the management apparatus 30 detects that the failed edge node 10 has the failure from a manual input by the operator or the like, for example.

FIG. 20 shows an example of the successor candidate selection screen 2000. As shown in FIG. 20, the successor candidate selection screen 2000 is provided with resource information display columns (an edge node ID 2011, an access right 2012, an operation status 2013, a priority 2014, and a takeover aptitude 2015) of the edge nodes 10 and a selection column 2016 of a successor edge node 10.

Returning to FIG. 19, when the successor edge node 10 is selected, the management apparatus 30 (or the core node 20) sends a takeover instruction (first instruction) to the successor edge node 10 (S1914).

When receiving the takeover instruction (S1921: YES), the successor edge node 10 changes its own access right (the content in the access right 1443 of the account information 144) from "RO" to "RW" (S1922). In addition, the successor edge node 10 sends an access right change instruction (second instruction) to the core node 20 (S1923).

When receiving the access right change instruction from the successor edge node 10 (S1931: YES), the core node 20 changes the content in the access right 2433 of the failed edge node 10 in the account information 243 from "RW" to "RO" and also changes the content in the access right 2433 of the successor edge node 10 in the account information 243 from "RO" to "RW" (S1933).

Thereafter, the core node 20 determines whether the successor edge node 10 is currently operating normally or not (S1934). Here, the core node 20 attempts, for example, to communicate with the successor edge node 10 to judge whether the successor edge node 10 is currently operating normally or not. Also, the core node 20 collects the resource information from the successor edge node 10 and checks the content in the resource information to judge whether the successor edge node 10 is currently operating normally or not.

When determining that the successor edge node 10 is currently operating normally (S1934: YES), the core node 20 notifies the management apparatus 30 that the takeover from the failed edge node 10 by the successor edge node 10 has been successful (S1935).

In contrast, when determining that the successor edge node 10 is not currently operating normally (S1934: NO), the core node 20 notifies the management apparatus 30 that the takeover had failed (S1936).

When receiving the notification from the core node 20 (S1941: YES), the management apparatus 30 checks what is indicated by the notification (S1941). When confirming that the takeover has been successful (S1942: YES), the processing returns to S1911. When confirming that the takeover had failed (S1942: NO), the processing returns to S1912.

2-2. Takeover Processing (Modified)

Figure 21:
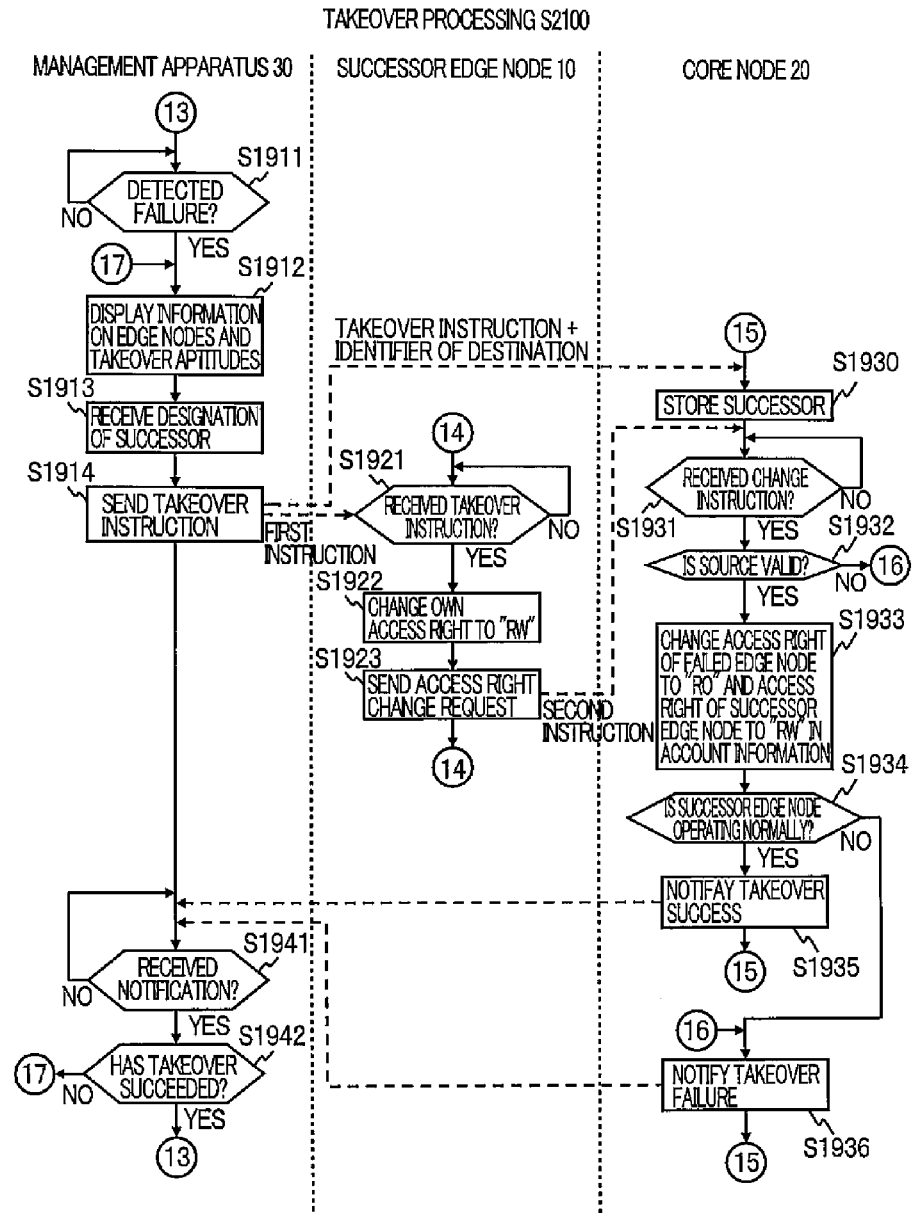
FIG. 21 is a flowchart for explaining a modified example of the takeover processing S1900.

FIG. 21 is a flowchart for explaining another mode of the takeover processing S1900 (hereinafter this processing will be referred to as takeover processing S2100).

In this takeover processing S2100, when sending the takeover instruction to the successor edge node 10 in S1914 in the foregoing takeover processing S1900, the management apparatus 30 also sends the takeover instruction and the edge node ID of the successor edge node 10 to the core node 20. The core node 20 receives and stores the takeover instruction and the edge node ID of the successor edge node 10 (S1930).

Also, when receiving the access right change instruction from the successor edge node 10 (S1931: YES), the core node 20 determines whether or not the source of the change instruction is identical to the edge node 10 identified by the edge node ID of the successor edge node 10 received and stored together with the takeover instruction (S1932). The core node 20 makes this judgment by checking whether or not the edge node ID of the source transmitted with the access right change instruction is identical to the edge node ID received and stored together with the takeover instruction. Then, the core node 20 changes the account information 243 (S1933) only when the two edge node IDs are identical to each other (S1932: YES), or notifies the management apparatus 30 of a failure in the takeover (S1936) when the two edge node IDs are not identical (S1932: NO).

In this takeover processing S2100, when receiving the access right change instruction from the successor edge node 10, the core node 20 checks whether or not the takeover instruction is sent from the management apparatus 30 to the edge node 10 of the source of the change instruction, and changes the account information 243 only after confirming that the takeover instruction is sent correctly, as described above. Thus, the account information 243 can be surely protected from fraudulent accesses.

Here, the other part of the processing shown in FIG. 21 is the similar to that in the takeover processing S1900 shown in FIG. 19.

2-3. Recovery Processing

Figure 22:
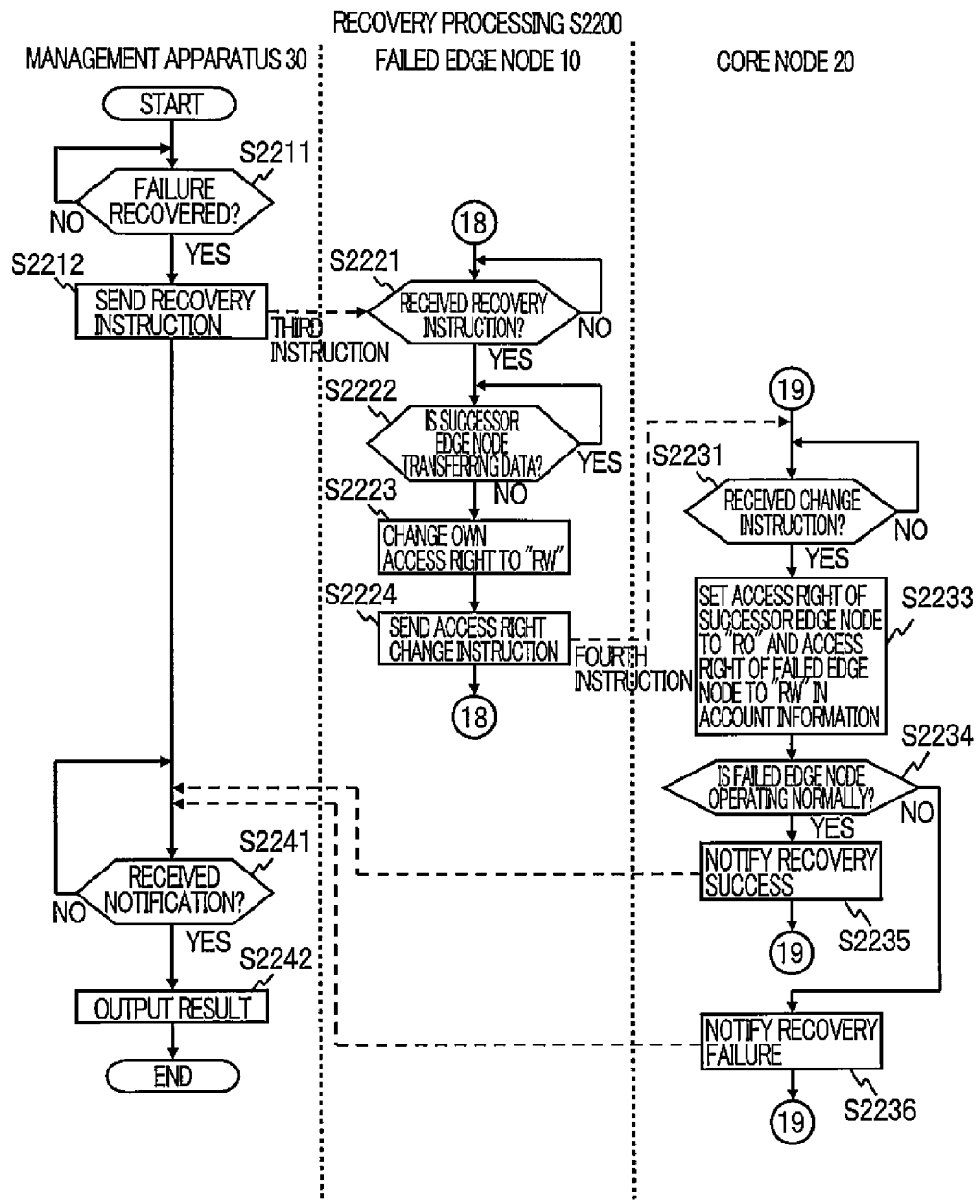
FIG. 22 is a flowchart for explaining recovery processing S2200.

FIG. 22 is a flowchart for explaining processing performed by the information processing system 1 when, after the failed edge node 10 has recovered from a failure, the successor edge node is taken over (recovered) by the failed edge node 10 (hereinafter this processing will be referred to as recovery processing S2200).

When detecting that the failed edge node 10 has recovered from the failure (S2211: YES), the management apparatus 30 sends the failed edge node 10 an instruction (third instruction, hereinafter referred to as a recovery instruction) to take over the access right "RW" from the edge node 10 currently granted the access right "RW" (that is, the successor edge node 10) (S2212).

Here, the management apparatus 30 detects that the failed edge node 10 had recovered from the failure from a manual input by the operator or the like, for example. Instead, the management apparatus 30 detects that the failed edge node 10 had recovered from the failure on the basis of the contents set in the edge node resource information 242, for example.

When receiving the recovery instruction from the management apparatus 30 (S2221: YES), the failed edge node 10 determines whether or not the successor edge node 10 is currently executing the file data transfer processing S1000 (S2222). The failed edge node 10 may make this determination by directly accessing the successor edge node 10, or by acquiring information on the successor edge node 10 indirectly through the core node 20 or the management apparatus 30.

When the successor edge node 10 is currently not performing data transfer (S2222: NO), the failed edge node 10 changes the access right 1443 in its own account information 144 to "RW" (S2223), and sends the core node 20 a change instruction (fourth instruction) to change its own access right and the access right of the successor edge node 10 (S2224). In this way, the failed edge node 10 changes the access right only after confirming that the successor edge node 10 is currently not performing data transfer. And this prevents failures such as file data inconsistency due to a change in the access right during the data transfer.

When receiving the access right change instruction from the failed edge node 10 (S2231: YES), the core node 20 changes the access right 2433 of the successor edge node 10 in the account information 243 from "RW" to "RO," and also changes the access right 2433 of the failed edge node 10 in the account information 243 from "RO" to "RW" (S2233).

Subsequently, the core node 20 determines whether or not the failed edge node 10 is currently operating normally (S2234). Then, when determining that the failed edge node 10 is currently operating normally (S2234: YES), the core node 20 notifies the management apparatus 30 that the recovery had been successful (S2235).

On the other hand, when determining that the failed edge node 10 is not currently operating normally (S2234: NO), the core node 20 notifies the management apparatus 30 of a failure in the recovery (S2236).

When receiving the above notification from the core node 20 (S2241: YES), the management apparatus 30 outputs the contents in the notification (S2242).

2-4. Recovery Processing (Modification)

Figure 23:
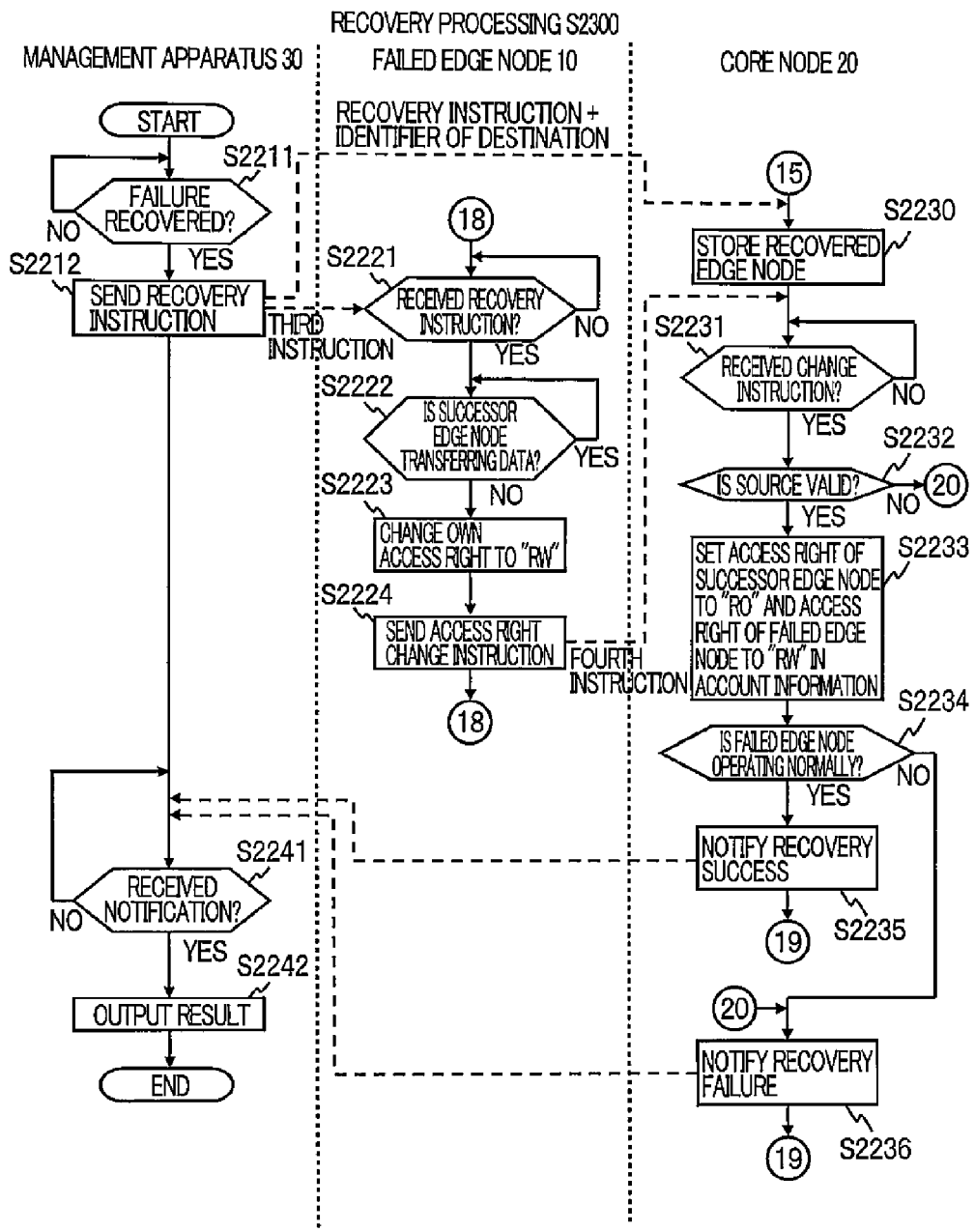
FIG. 23 is a flowchart for explaining a modified example of the recovery processing S2200.

FIG. 23 is a flowchart for explaining another mode of the recovery processing S2200 (hereinafter this processing will be referred to as recovery processing S2300).

In this recovery processing S2300, when sending the recovery instruction to the failed edge node 10 in S2212 in the foregoing recovery processing S2200, the management apparatus 30 also sends the recovery instruction and the edge node ID of the failed edge node 10 to the core node 20. The core node 20 receives and stores the recovery instruction and the edge node ID of the failed edge node 10 (S2230).

On the other hand, when receiving the access right change instruction from the failed edge node 10 (S2231: YES), the core node 20 determines whether or not the source of the change instruction is identical to the edge node 10 identified by the edge node ID of the failed edge node 10 received together with the recovery instruction (S2232). The core node 20 makes this judgment by checking whether or not the edge node ID of the source accompanying the access right change instruction is identical to the edge node ID received and stored together with the recovery instruction. Then, the core node 20 changes the account information 243 (S2233) only when the two edge node IDs are identical to each other (S2232: YES), or notifies the management apparatus 30 that the recovery had failed (S2236) when the two edge node IDs are not identical (S2232: NO).

In this recovery processing S2300, when receiving the access right change instruction from the failed edge node 10, the core node 20 checks whether or not the recovery instruction is sent from the management apparatus 30 to the edge node 10 of the source of the change instruction, and changes the account information 243 only after confirming that the recovery instruction is sent. Thus, the account information 243 can be surely protected from fraudulent accesses.

Here, other parts of the processing shown in FIG. 23 are the same as that in the recovery processing S2200 shown in FIG. 22.

The embodiments of the present invention have been described hereinabove. However, the foregoing embodiments are intended to facilitate the understanding of the present invention and are not intended to limit the interpretation of the present invention. The present invention can be altered and modified without departing from the spirit of the invention, and also includes equivalents thereof.

The invention claimed is:

1. An information processing system comprising:
a plurality of first information apparatuses configured to provide a service relating to a file;
a second information apparatus communicatively coupled to each of the plurality of first information apparatuses and configured to send or receive data of the file to or from the plurality of first information apparatuses as well as manage the data of the file; and
a management apparatus communicatively coupled to the second information apparatus, wherein
at least one of the first information apparatuses is granted a first right that is an access right permitting update of the file,
the other of the first information apparatuses are granted a second right that is an access right prohibiting update of the file,
wherein the second information apparatus is configured to
store the access right granted to each of the first information apparatuses,
send to one of the first information apparatuses granted the second right, when detecting that the first information apparatus granted the first right has a failure, a first instruction made to take over the first right granted to the first information apparatus having the failure, and
collect, from each of the first information apparatuses, resource information being information on resources of the first information apparatus, the resource information is at least one of a processing capacity of a central processing device included in the first information apparatus, a utilization rate of the central processing device, a capacity of a main storage device included in the first information apparatus, a utilization rate of a storage area of the main storage device, a capacity of a communication device included in the first information apparatus, a utilization rate of the communication device, and a capacity of an external storage device included in the first information apparatus and a utilization rate of a storage area of the external storage device, and
wherein the management apparatus determines an aptitude of each of the first information apparatuses granted the second right, as a successor of the first information apparatus having the failure, based on the collected resource information, and outputs results thereof.

2. The information processing system according to claim 1, wherein
the first information apparatus granted the second right, when receiving the first instruction, sends the second information apparatus a second instruction to change the access right granted to the first information apparatus itself to the first right, and
the second information apparatus, when receiving the second instruction, changes the stored access right of the first information apparatus to the first right.

3. The information processing system according to claim 2, wherein the second information apparatus
stores information identifying the first information apparatus of a destination when sending the first instruction, and
determines whether or not a source of the second instruction is identical to the first information apparatus specified by the stored information when receiving the second instruction, and changes the stored access right of the first information apparatus to the first right only when the source and the first information apparatus are identical.

4. The information processing system according to claim 1, wherein
the second information apparatus collects from each of the first information apparatuses, resource information being information on resources of the first information apparatus, at a time point before a failure occurs in the first information apparatus granted the first right, and
the management apparatus determines the aptitude of each of the first information apparatuses granted the second right as a successor of the first information apparatus granted the first right, based on the collected resource information, and outputs results thereof, at a time point before a failure occurs in the first information apparatus granted the first right.

5. The information processing system according to claim 1, wherein
the first information apparatus granted the first right when having updated the file, sends data of the file to the second information apparatus, and
the second information apparatus
when receiving the data of the file, updates data of a file managed by itself and corresponding to the received file, and
sends information indicating the updated file to the first information apparatuses granted the second right.

6. The information processing system according to claim 5, wherein
the first information apparatus granted the second right receives information indicating the updated file, and identifies data of the file yet to be acquired based on the received information, and makes a request to the second information apparatus for data of the identified file.

7. The information processing system according to claim 1, wherein
the second information apparatus when detecting that the first information apparatus that had the failure has recovered from the failure, sends the first information apparatus recovered from the failure a third instruction to take over the first right from the first information apparatus currently granted the first right,
the first information apparatus that has recovered from the failure, when receiving the third instruction, sends the second information apparatus a fourth instruction to change the access right granted to the first information apparatus itself to the first right, and to change the access right of the first information apparatus currently granted the first right to the second right, and
the second information apparatus, when receiving the fourth instruction, changes an access right of the first information apparatus that has recovered from the failure stored therein to the first right, and changes the stored access right of the first information apparatus currently granted the first right to the second right.

8. The information processing system according to claim 7, wherein
the first information apparatus that has recovered from the failure, when receiving the third instruction, communicates with the second information apparatus or the first information apparatus of the successor granted the first right to thereby determine whether or not the first information apparatus granted the first right is currently transmitting the data of the file to the second information apparatus, and sends the fourth instruction to the second information apparatus after confirming that the first information apparatus granted the first right is not currently transmitting.

9. The information processing system according to claim 7, wherein
the second information apparatus
stores information identifying the first information apparatus of a destination when sending the third instruction, and
determines whether or not a source of the third instruction is identical to the first information apparatus specified by the stored information when receiving the fourth instruction, and changes an access right of the first information apparatus recovered from the failure to the first right and the second information apparatus changes the stored access right of the first information apparatus currently granted the first right to the second right upon reception of the fourth instruction only when the first information apparatus and the source of the third instruction are identical.

10. A method of controlling an information processing system including
a plurality of first information apparatuses configured to provide a service relating to a file,
a second information apparatus communicatively coupled to each of the plurality of first information apparatuses and configured to send or receive data of the file to or from the plurality of first information apparatuses as well as manage the data of the file, and
a management apparatus communicatively coupled to the second information apparatus,
at least one of the first information apparatuses is granted a first right that is an access right permitting update of the file, and
any two or more of the first information apparatuses are granted a second right that is an access right prohibiting update of the file, the method comprising:
the second information apparatus
storing the access right granted to each of the first information apparatuses;
sending to one of the first information apparatuses granted the second right, when detecting that the first information apparatus granted the first right has a failure, a first instruction made to take over the first right granted to the first information apparatus having the failure,
collecting from each of the first information apparatuses, resource information being information on resources of the first information apparatus, the resource information is at least one of a processing capacity of a central processing device included in the first information apparatus, a utilization rate of the central processing device, a capacity of a main storage device included in the first information apparatus, a utilization rate of a storage area of the main storage device, a capacity of a communication device included in the first information apparatus, a utilization rate of the communication device, and a capacity of an external storage device included in the first information apparatus and a utilization rate of a storage area of the external storage device, and
the management apparatus determining an aptitude of each of the first information apparatuses granted the second right, as a successor of the first information apparatus having the failure, based on the collected resource information, and outputs results thereof.

11. The method of controlling an information processing system according to claim 10, wherein
the second information apparatus collects from each of the first information apparatuses, resource information being information on resources of the first information apparatus, at a time point before a failure occurs in the first information apparatus granted the first right, and
the management apparatus determines the aptitude of each of the first information apparatuses granted the second right as a successor of the first information apparatus granted the first right, based on the collected resource information, and outputs results thereof, at a time point before a failure occurs in the first information apparatus granted the first right.

12. The method of controlling an information processing system according to claim 10, wherein
the second information apparatus when detecting that the first information apparatus that had the failure has recovered from the failure, sends the first information apparatus recovered from the failure a third instruction to take over the first right from the first information apparatus currently granted the first right,
the first information apparatus that has recovered from the failure, when receiving the third instruction, sends the second information apparatus a fourth instruction to change the access right granted to the first information apparatus itself to the first right, and to change the access right of the first information apparatus currently granted the first right to the second right, and
the second information apparatus, when receiving the fourth instruction, changes an access right of the first information apparatus that has recovered from the failure stored therein to the first right, and changes the stored access right of the first information apparatus currently granted the first right to the second right.

* * * * *